(12) United States Patent  
Kurinami et al.

(10) Patent No.: US 7,222,269 B2  
(45) Date of Patent: May 22, 2007

(54) PERFORMANCE EVALUATION DEVICE, PERFORMANCE EVALUATION INFORMATION MANAGING DEVICE, PERFORMANCE EVALUATION METHOD, PERFORMANCE EVALUATION INFORMATION MANAGING METHOD, PERFORMANCE EVALUATION SYSTEM

(75) Inventors: Kentaro Kurinami, Tokyo (JP); Yoshifumi Sakai, Tokyo (JP); Takashi Oshiro, Tokyo (JP); Tatsuya Hasegawa, Tokyo (JP)

(73) Assignee: NS Solutions Corporation, Tokyo (JP)

( * ) Notice: Subject to any disclaimer, the term of this patent is extended or adjusted under 35 U.S.C. 154(b) by 506 days.

(21) Appl. No.: 10/309,203

(22) Filed: Dec. 4, 2002

(65) Prior Publication Data

US 2003/0110421 A1 Jun. 12, 2003

(30) Foreign Application Priority Data

Dec. 6, 2001 (JP) ............................. 2001-373304  
Dec. 28, 2001 (JP) ............................. 2001-399509

(51) Int. Cl.  
*G06F 11/00* (2006.01)

(52) U.S. Cl. ........................................ 714/47; 709/224
(58) Field of Classification Search ................. 715/736  
See application file for complete search history.

(56) References Cited

U.S. PATENT DOCUMENTS 5,506,955 A * 4/1996 Chen et al. ................... 714/26  
5,748,881 A * 5/1998 Lewis et al. ................. 714/47  
5,819,066 A * 10/1998 Bromberg et al. .......... 707/102  
5,872,976 A * 2/1999 Yee et al. .................... 717/127  
6,108,800 A * 8/2000 Asawa ......................... 714/47  
6,249,886 B1 * 6/2001 Kalkunte ..................... 714/47  
6,467,052 B1 * 10/2002 Kaler et al. .................. 714/39  
6,557,036 B1 * 4/2003 Kavacheri et al. .......... 709/224  
6,578,077 B1 * 6/2003 Rakoshitz et al. .......... 709/224  
6,631,409 B1 * 10/2003 Watson et al. .............. 709/224  
6,687,560 B2 * 2/2004 Kiser et al. .................. 700/108  
6,892,236 B1 * 5/2005 Conrad et al. .............. 709/224  
2003/0204588 A1 * 10/2003 Peebles et al. .............. 709/224

FOREIGN PATENT DOCUMENTS

JP 57071060 A 5/1982  
JP 60007554 A1 1/1985

(Continued)

OTHER PUBLICATIONS

Nikkei Communications No. 340, Apr. 16, 2001, pp. 210-213.

(Continued)

*Primary Examiner*—Robert Beausoliel  
*Assistant Examiner*—Philip Guyton  
(74) *Attorney, Agent, or Firm*—Arent Fox LLP

(57) ABSTRACT

A tabular form screen on which input fields for a parameter and a set value can be added is used as a condition input screen. In a test pattern control part, set values of different parameter groups inputted via the condition input screen are arbitrarily combined, one set value group from each parameter group being selected for one combination, to automatically generate test patterns and parameter files which are information on the set values. An execution control section can control a server and a client terminal of an information processing system to execute performance tests successively only with one input operation based on the generated parameter files.

4 Claims, 16 Drawing Sheets

FOREIGN PATENT DOCUMENTS

| | | |
|---|---|---|
| JP | 62049556 A | 3/1987 |
| JP | 01315837 A | 12/1989 |
| JP | 02035533 A | 2/1990 |
| JP | 02162436 A | 6/1990 |
| JP | 03237852 A | 10/1991 |
| JP | 03262050 A | 11/1991 |
| JP | 04186445 A | 7/1992 |
| JP | 05151013 A | 6/1993 |
| JP | 05197590 A | 6/1993 |
| JP | 05233645 A | 9/1993 |
| JP | 05257741 | 10/1993 |
| JP | 063332747 | 12/1994 |
| JP | 07093187 A | 4/1995 |
| JP | 07318380 A | 12/1995 |
| JP | 08070352 A | 3/1996 |
| JP | 09091031 A | 4/1997 |
| JP | 09311782 A | 12/1997 |
| JP | 10027099 A | 1/1998 |
| JP | 10143401 A | 5/1998 |
| JP | 10293747 A | 11/1998 |
| JP | 11212830 A | 8/1999 |
| JP | 2000075978 A | 3/2000 |
| JP | 2000105713 A | 4/2000 |
| JP | 2000112784 A | 4/2000 |
| JP | 2000172537 A | 6/2000 |
| JP | 2000-267890 | 9/2000 |
| JP | 2000329656 A | 11/2000 |
| JP | 2001-154889 A | 6/2001 |
| JP | 2001249833 A | 9/2001 |
| JP | 2001-273174 | 10/2001 |
| JP | 2002208956 A | 7/2002 |
| JP | 2002357535 A | 12/2002 |

OTHER PUBLICATIONS

Daisuke Nishioka et al., "Remote Simulation Environment for IT Performance Evaluation", Computer System Symposium, ISPJ Symposium Series, Nov. 13, 2003, Information Processing Society of Japan, vol. 2001, No. 16, p. 129-135.

* cited by examiner

FIG. 5

| | PATTERN X1 (C1) | PATTERN X2 (C2) | PATTERN X3 (C3) |
|---|---|---|---|
| PATTERN Y1 (S1, T1, W1) | ☑ | □ | □ |
| PATTERN Y2 (S1, T1, W2) | ☑ | □ | □ |
| PATTERN Y3 (S1, T2, W1) | ☑ | □ | □ |
| PATTERN Y4 (S1, T2, W2) | □ | ☑ | □ |
| PATTERN Y5 (S1, T3, W1) | □ | ☑ | □ |
| PATTERN Y6 (S1, T3, W2) | □ | ☑ | □ |
| PATTERN Y7 (S2, T1, W1) | □ | □ | □ |
| PATTERN Y8 (S2, T1, W2) | □ | □ | □ |
| PATTERN Y9 (S2, T2, W1) | □ | □ | ☑ |
| PATTERN Y10 (S2, T2, W2) | □ | □ | ☑ |
| PATTERN Y11 (S2, T3, W1) | □ | □ | ☑ |
| PATTERN Y12 (S2, T3, W2) | □ | □ | ☑ |

EXECUTION ~501

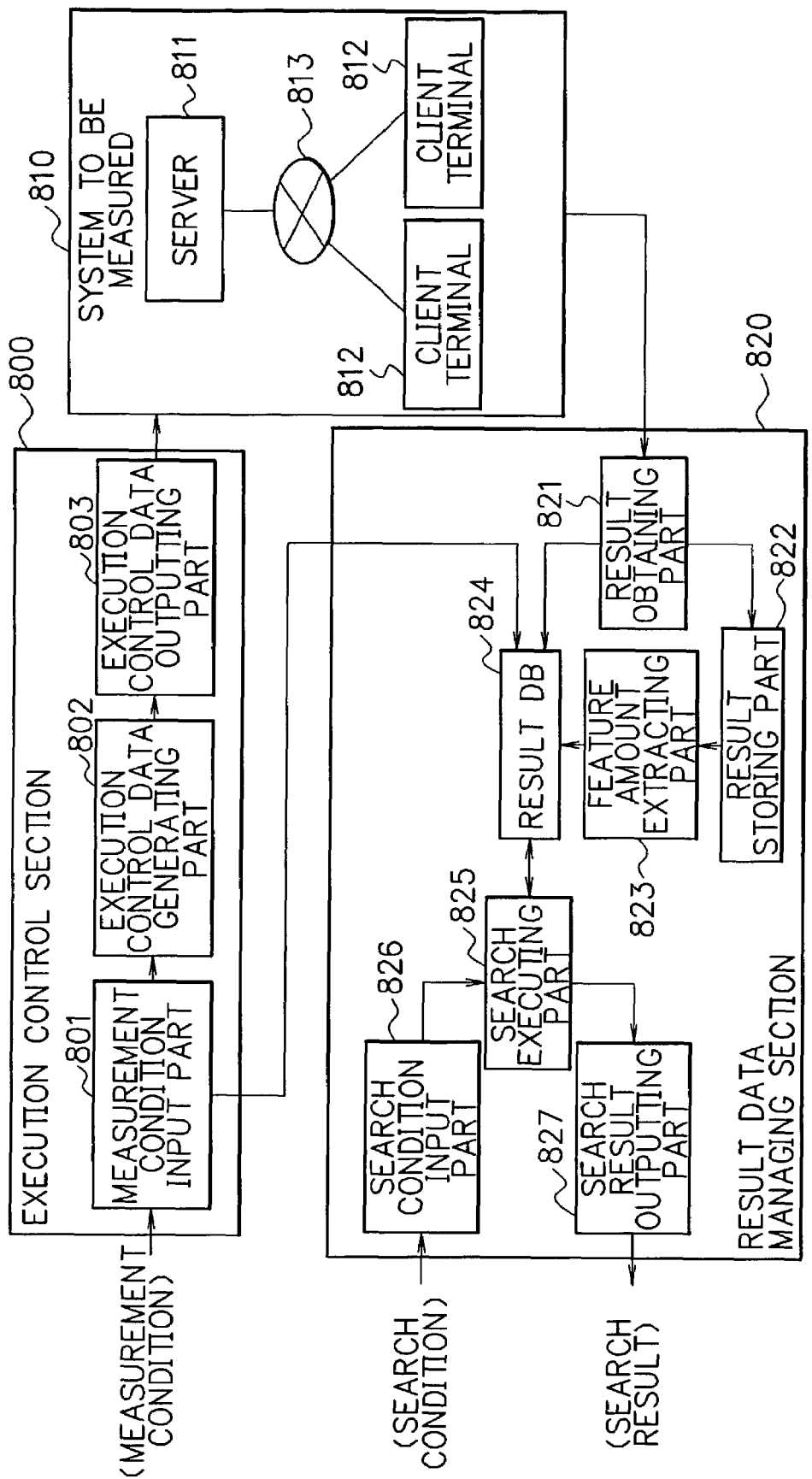

PERFORMANCE EVALUATION DEVICE, PERFORMANCE EVALUATION INFORMATION MANAGING DEVICE, PERFORMANCE EVALUATION METHOD, PERFORMANCE EVALUATION INFORMATION MANAGING METHOD, PERFORMANCE EVALUATION SYSTEM

CROSS-REFERENCE TO RELATED APPLICATIONS

This application is based upon, and claims priority of Japanese Patent Application Nos. 2001-373304, filed on Dec. 6, 2001, and 2001-399509, filed on Dec. 28, 2001, the contents being incorporated herein by reference.

BACKGROUND OF THE INVENTION

1. Field of the Invention

The present invention relates to a performance evaluation device, a performance evaluation information managing device, a performance evaluation method, a performance evaluation information managing method, a performance evaluation system, a storage medium, and a computer program product, and more particularly, the present invention is suitable for use as a performance evaluation device for successively measuring the performance of an information processing system under a plurality of different measurement conditions, and a performance evaluation information managing device for managing performance evaluation information on the information processing system which is obtained by the measurement.

2. Description of the Related Art

Conventionally, a performance measurement test called a benchmark test (hereinafter, referred to also as a 'benchmark') is adopted as a method of measuring the performance of an information processing system (information processing apparatus) in order to compare and evaluate the performance of hardware and software of the information processing system under various conditions. In the benchmark, a measurement condition consisting of a plurality of parameters of the information processing system to be measured is inputted and defined sequentially every time one benchmark is executed, and the information processing system executes the processing based on the defined measurement condition, thereby measuring the performance. Performance evaluation information (benchmark result data) obtained from the measurement is used to evaluate the performance of, for example, a newly configured information processing system and to judge whether or not the information processing system satisfies desired performance requirements, thereby evaluating the performance of the information processing system.

For example, when the performance of a mail server is to be measured as an information processing system, the number of CPUs that the mail server has, the number of users using the mail server, the data size of transmitted/received electronic mails, and so on are defined as the measurement condition. Then, according to the defined measurement condition, the same number of client terminals and operators as the number of the users are prepared and the operators manually access the mail server to measure the performance of the mail server. Alternatively, the defined measurement condition is converted to data (program) as a virtual process and the client terminals execute the virtual process to measure the performance of the mail server.

Further, when the performance of the information processing system is to be measured under a different measurement condition after being measured under a certain measurement condition, an operator inputs and redefines the new measurement condition to have the information processing system execute the processing based on the redefined measurement condition, thereby measuring the performance. In short, the measurement condition input work by the operator and the execution of the benchmark are repeated, thereby measuring the performance of the information processing system under the plural different measurement conditions. Thus, the performance of the information processing system is measured under the plural different measurement conditions, and the measurement results are evaluated and compared to determine the specifications of the mail server best conforming to usage conditions thereof.

In executing the conventional benchmark described above, however, the following problems exist.

-First Problem-

Every time the benchmark is to be executed, the operator defining the measurement condition is required to define the measurement condition and to carry out the input work of a new measurement condition and the correction work.

Therefore, even when the benchmarks are to be executed under the plural different measurement conditions respectively, the automatic execution of the successive benchmarks is not possible. In other words, the operator has to carry out the input work and the correction work for inputting and redefining a new measurement condition after confirming the end of the benchmark under one measurement condition, which causes the problem of extremely low efficiency in executing the performance measurement.

Further, for example, when the measurement conditions such as the number of CPUs that the information processing system has, memory size, and so on are changed to execute the benchmarks respectively, it is conventionally necessary to insert or remove a CPU, a memory, and so on according to the measurement conditions. Therefore, also when the number of the CPUs, memory size, and so on are changed, the operator has to insert or remove a CPU, a memory, and so on in order to define the new measurement condition after confirming that the benchmark under one measurement condition is finished.

Moreover, depending on the kind of the benchmark and the measurement condition, the processing (the execution of the benchmark) sometimes takes many hours. For example, the execution result of the benchmark is sometimes obtained (the benchmark is finished) late at night. In such a case, since the operator is often absent, a next measurement condition is not inputted until the operator's operation next morning, thereby causing the problem of a waste of time.

-Second Problem-

In defining the measurement condition, a different measurement condition is defined for each information processing system (application of the information processing system) to be measured. For example, when the performance of a mail server is measured as an information processing system, measurement conditions such as the data size of transmitted/received electronic mails, the number of accessing users, access frequency by the users, and so on are defined. When the performance of a web server is measured, measurement conditions such as the number of simultaneous accesses, the data size of one content provided to the users, the existence or nonexistence of an applet and a servelet, and so on are defined.

Since a different measurement condition is thus defined for each information processing system, as for a user interface used by the operator at the time of inputting the measurement condition, each information processing system has a different and specialized user interface. Therefore, when the same operator tries to execute the benchmarks for various different information processing systems, the operator has to define the measurement conditions using different user interfaces for respective information processing systems, which causes the problem of complicated work and lack of convenience.

-Third Problem-

As stated in the above first problem, in order to execute the benchmarks under the plural different conditions, the input work for each item in the measurement condition has to be repeated even when only a part of the measurement condition is changed. This results in extremely low work efficiency and sometimes causes input mistakes of the measurement condition and the like by the operator. Even when the different part in the changed measurement condition is inputted again, if there are many combinations of the measurement conditions, the operator sometimes forgets to correct the measurement condition for which the re-input is necessary or forgets to input some measurement condition.

Therefore, when the benchmarks are executed under the plural different conditions, there exists such a problem that an enormous amount of time and labor is required for a confirmation work on whether or not the measurement condition to be inputted is the same as the inputted measurement condition, in order to prevent the input mistakes of the measurement conditions, and the like. Further, when the input mistakes of the measurement conditions and the like are not detected in the confirmation work, there exists such a problem that the benchmark cannot be executed under a desired measurement condition.

Further, in the conventional benchmark, when a benchmark under a certain measurement condition is executed in an information processing system, the resultant performance evaluation information is individually (independently) saved and managed for each information processing system or for each benchmark. Hence, it is very difficult to search for and compare the performance evaluation information obtained from benchmarks executed in the past.

For example, suppose that the performance of the information processing system under a certain measurement condition is to be evaluated by referring to the performance evaluation information obtained from the benchmarks executed in the past. At this time, a person trying to refer to the performance evaluation information obtained in the past (a person evaluating the performance), manually searches performance evaluation reports and the like and extracts an example in which a benchmark is executed by a similar information processing system and under a similar measurement condition, depending on his/her own memory.

However, the contents (items) of the performance evaluation information and output forms thereof vary depending on tools for executing the benchmarks, and each writer of the performance evaluation report writes in a different manner. Moreover, an example in which the benchmark is executed in a similar information processing system and under a similar measurement condition cannot always be extracted. Therefore, the search and comparison of the performance evaluation information obtained from the benchmarks executed in the past is troublesome, and in addition, result in an extreme waste of time and labor of the person evaluating the performance.

SUMMARY OF THE INVENTION

The present invention is made in order to solve the above-described problems, and its object is to enable simultaneous input of a plurality of different measurement conditions and to enable automatic and successive performance tests of an information processing system under the plural different measurement conditions.

Another object of the present invention is to enable concentrated management of performance evaluation information obtained through the execution of performance measurement tests under various measurement conditions in an information processing system, by saving and accumulating the performance evaluation information on a common storage medium.

In order to attain the above objects, the present invention is characterized in that a condition input screen via which information relevant to a measurement condition is to be inputted is divided into a portion relevant to a first information processing part providing the service, a portion relevant to a second information processing part receiving the service, and a portion relevant to the service, thereby enabling a common form to be used for the condition input screen irrespective of the service and allowing a plurality of set values to be inputted for one item in the measurement condition, and an information processing system is controlled to execute a performance measurement test based on performance test data which is automatically generated by arbitrarily combining set values, which are inputted through the condition input screen, of different items in the measurement condition.

Another characteristic of the present invention is that in an information processing system to be measured, execution results of performance measurement tests executed under a plurality of measurement conditions are respectively obtained, and performance evaluation information obtained respectively from the obtained execution results and the measurement conditions corresponding to this performance evaluation information are stored on a storage medium in such a manner that they are related to each other.

Since the present invention is constituted of the above technical means, a plurality of measurement conditions are simultaneously inputted on the condition input screen and arbitrarily combined so that it is possible to cause the information processing system to execute the performance measurement tests based on a plurality of performance test data automatically generated and to execute the performance measurement tests under the plural different measurement conditions automatically and successively.

Further, when the performance evaluation information and the measurement conditions corresponding thereto are stored on the storage medium in a such manner that they are related to each other, sets of the plural measurement conditions and the performance evaluation information related to each other are stored on the storage medium, being classified by each measurement condition so that it is possible to concentratedly manage the performance evaluation information obtained from the performance measurement tests under various measurement conditions.

BRIEF DESCRIPTION OF THE DRAWINGS

FIG. 5 is a view showing an example of a test pattern selection screen;

FIG. 8 is a block diagram showing a configuration example of a performance evaluation system according to a second embodiment of the present invention;

DETAILED DESCRIPTION OF THE PREFERRED EMBODIMENTS

Hereinafter, embodiments of the present invention will be explained with reference to the drawings.

-First Embodiment-

Figure 1:
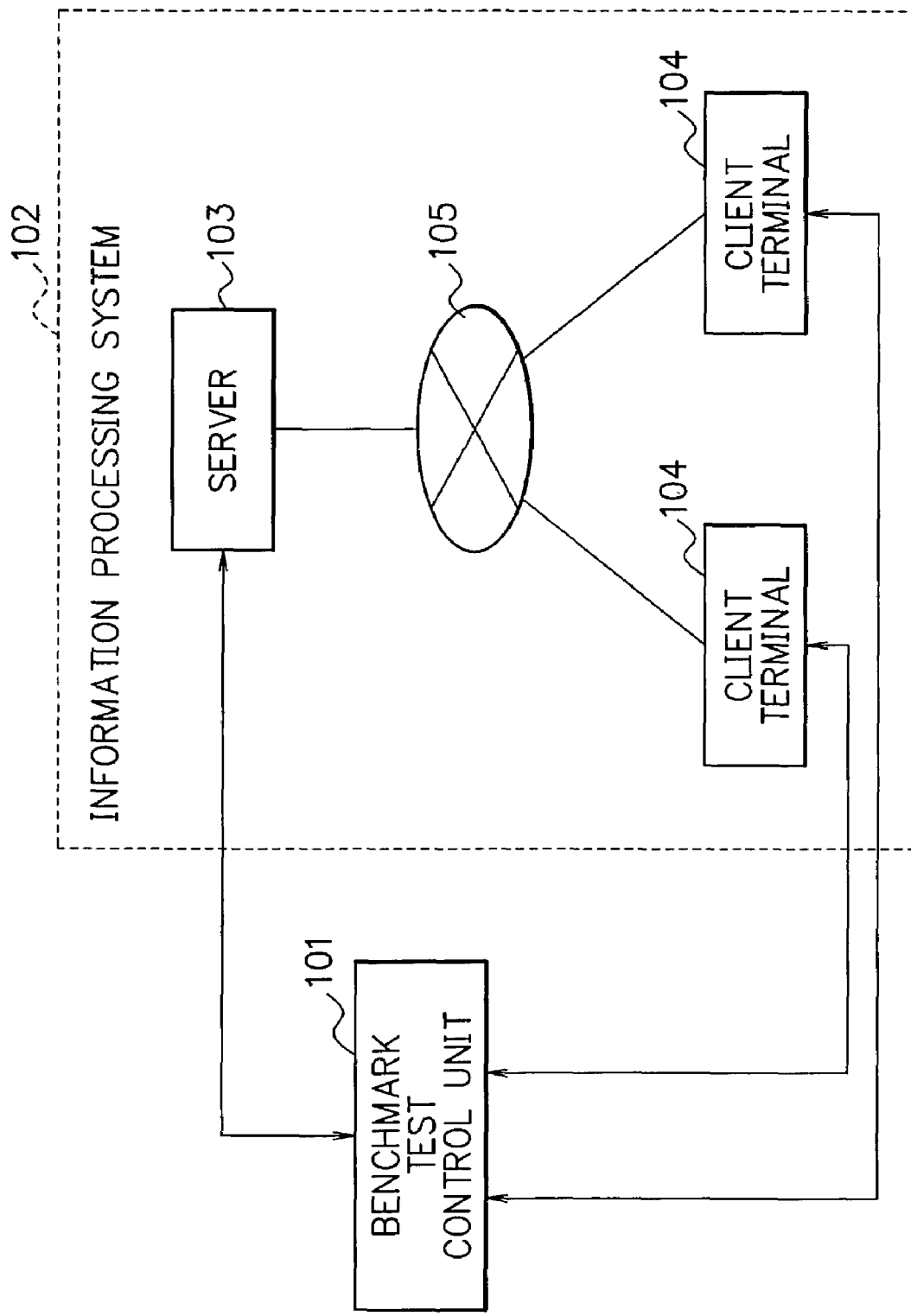
FIG. 1 is a block diagram showing a configuration example of a performance evaluation system provided with a benchmark test control unit according to a first embodiment of the present invention.

FIG. 1 is a block diagram showing a configuration example of a performance evaluation system to which a performance evaluation device according to a first embodiment of the present invention is applied. Note that a performance evaluation system which is one of client-server-type systems and which is to measure the performance of a mail system transmitting and receiving electronic mails is shown in FIG. 1 as an example.

In FIG. 1, 101 denotes a benchmark test control unit (hereinafter, referred to also as a 'benchmark control unit') to which the performance evaluation device according to this embodiment is applied. The benchmark control unit 101 displays a condition input screen, a test pattern selection screen, a result display screen, and so on. The benchmark control unit 101 generates a test pattern (measurement condition) which is a combination of condition patterns, each being a group of set values of each parameter classified by each parameter group for a benchmark. The benchmark control unit 101 supplies an information processing system 102 to be measured with the set values of each parameter for the benchmark to be executed, thereby controlling the execution of the benchmark. Incidentally, the benchmark control unit 101 will be described in detail later.

The information processing system 102 is composed of a mail server 103 and client terminals 104.

The mail server 103 transmits/receives electronic mails and manages the electronic mails in the information processing system 102. The mail server 103 changes hardware configuration such as the number of its own CPUs, memory size, and so on in response to an instruction from the benchmark control unit 101, and supplies the benchmark control unit 101 with a measurement result (resource information such as a CPU operating ratio) in the benchmark every time the test pattern (measurement condition) is changed.

The client terminals 104 are terminals which access the mail server 103 to transmit/receive electronic mails. In the first embodiment, each of the client terminals 104 generates a virtual process based on the set values of each parameter for the benchmark, which are supplied from the benchmark control unit 101, and accesses the mail server 103 according to the generated virtual process. The client terminal 104 supplies the benchmark control unit 101 with a measurement result (response time of the mail server 103 to an access and so on) in the benchmark every time the test pattern (measurement condition) is changed.

The benchmark control unit 101, the mail server 103, and the client terminals 104 are connected to one another via individual signal lines so as to be communicatable with one another. The mail server 103 and each of the client terminals 104 are connected via a network 105 such as LAN (Local Area Network), WAN (Wide Area Network), or the like by not-shown network interfaces provided therein respectively so as to be communicatable with each other.

Incidentally, in FIG. 1, the benchmark control unit 101, the mail server 103, and the client terminals 104 are connected via the individual signal lines respectively, but the benchmark control unit 101 may be connected to the network 105 so as to be communicatable with the mail server 103 and the client terminals 104.

Further, in FIG. 1, though two of the client terminals 104 are shown, any client terminal may be used as long as it has a processing capacity large enough to execute the benchmark and to supply the result thereof to the benchmark control unit 101, and any number of the client terminals 104 may be provided.

Figure 2:
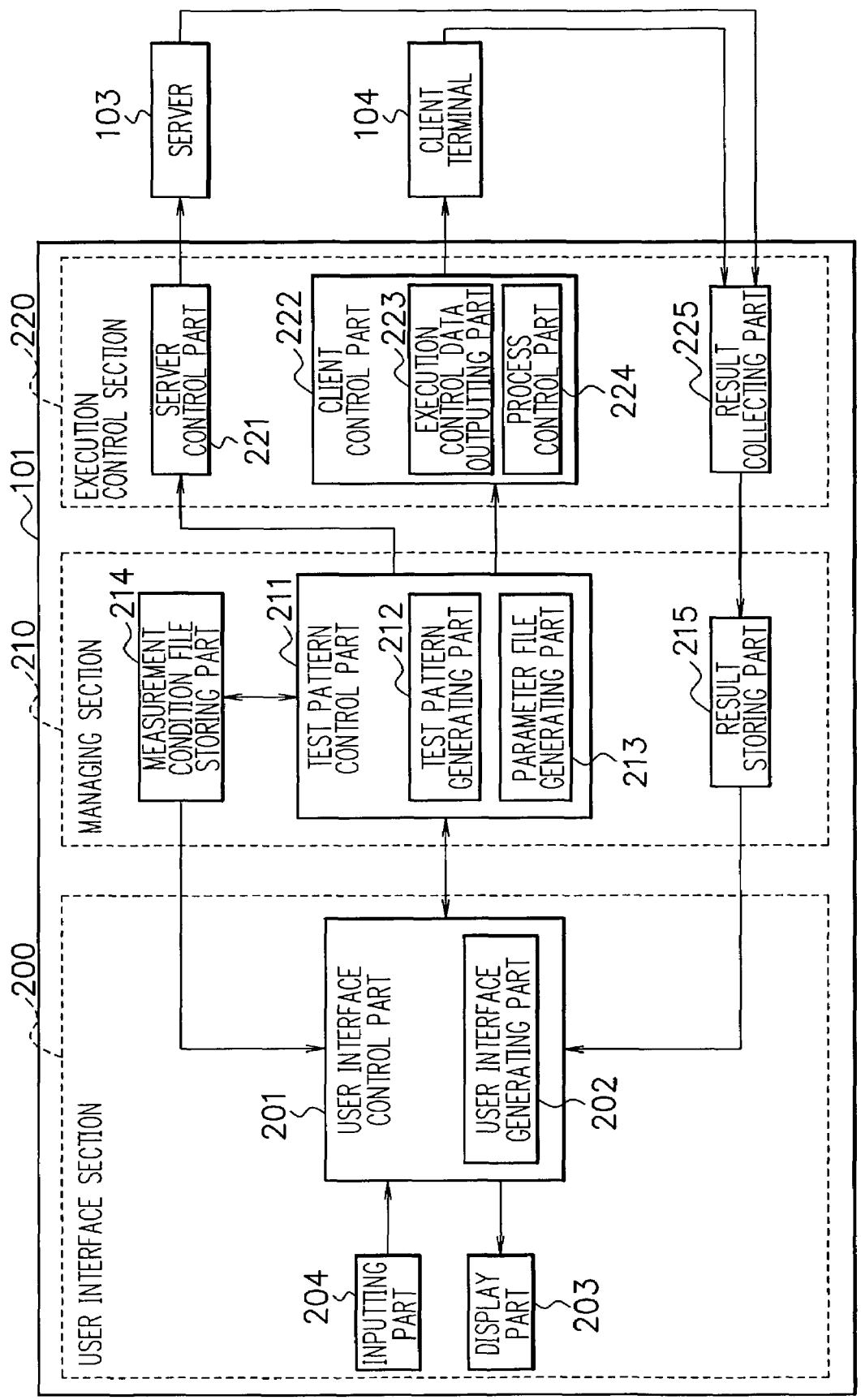
FIG. 2 is a block diagram showing a configuration example of the benchmark test control unit according to the first embodiment.

FIG. 2 is a block diagram showing a configuration example of a benchmark control unit 101 according to the first embodiment. Note that, in FIG. 2, the same reference numerals are used to designate blocks having the same functions as those of blocks shown in FIG. 1, and the explanation having, the same contents will be omitted.

In FIG. 2, the benchmark control unit 101 is composed of a user interface section 200, a managing section 210, and an execution control section 220.

The user interface section 200 is composed of a user interface control part 201 including a user interface generating part 202, a display part 203 provided with a display device such as, for example, a display, and an inputting part 204 provided with an inputting device such as, for example, a keyboard or a mouse.

The user interface control part 201 supplies the managing section 210 with information (measurement condition values for the benchmark, selection (execution)/non-selection (non-execution) of the test pattern, and so on) inputted from the inputting part 204. The user interface control part 201 also reads data (file) from the managing section 210 based on an instruction or the like inputted from the inputting part 204, and generates a user interface appropriate for the data in the user interface generating part 202 to supply the generated user interface to the display part 203.

The display part 203 is intended for displaying display screens relevant to display data supplied from the user interface control part 201. The display screens to be displayed include a condition input screen, a test pattern selection screen, a result display screen, and so on.

The condition input screen is a screen on which the operator adds/deletes a parameter (an item for which the measurement condition such as the number of CPUs, the number of users on a client side, processing contents, and so on are inputted) for the benchmark and on which the operator inputs set values (measurement condition values) of the parameter. The test pattern selection screen is a screen for displaying all the test patterns prepared based on the inputted condition patterns for the benchmark (set values for the parameter) and guiding the operator to select a test pattern to be executed. The result display screen is a screen for presenting the measurement result of the performance in the executed benchmark to the operator or the like.

The inputting part 204 inputs the parameters and the set values for the benchmark and selects the test pattern to be executed from all the test patterns to supply them to the user interface control section 201.

The managing section 210 stores data such as the test pattern, the parameter, and its set values for the benchmark, a measurement result of the benchmark, and the like, and supplies the stored data to the user interface section 200 and the execution control section 220. The managing section 210 is composed of a test pattern control part 211 including a test pattern generating part 212 and a parameter file generating part 213, a measurement condition file storing part 214, and a result storing part 215.

The test pattern control part 211 generates all the test patterns and parameter files for the benchmark based on the parameters and the condition patterns for the benchmark which are supplied from the user interface section 200. The test pattern control part 211 also requests the operator to select the test pattern to be executed from all the generated test patterns, and supplies the execution control section 220 with the parameter file corresponding to the test pattern to be executed.

The test pattern generating part 212 generates all the test patterns for the benchmark according to the condition patterns for the benchmark inputted from the inputting part 204 according to the condition input screen and supplied thereto via the user interface control part 201. In other words, the test pattern generating part 212 automatically generates all the combinations of the condition patterns of the different parameter groups.

The parameter file generating part 213 generates the parameter files of all the test patterns based on the condition patterns for the benchmark which are inputted from the inputting part 204 according to the condition input screen and supplied via the user interface control part 201. Here, the parameter file represents the measurement condition (set values of each parameter) for the benchmark in which condition patterns of the parameter groups are combined, one condition pattern being selected from each parameter group for one combination. One parameter file exists for one test pattern.

For example, when there are four parameter groups for the benchmark and three types of condition patterns are set for each parameter group, the test pattern generating part 212 generates 81 types (3×3×3×3) of the test patterns. At this time, the parameter file generating part 213 selects one condition pattern from each of the four parameter groups to arbitrarily combine the selected condition patterns, thereby generating 81 parameter files corresponding to 81 types of test patterns respectively.

The test patterns and the parameter files generated in the above-described manner are supplied to the execution control section 220 when necessary, and stored and saved in the measurement condition file storing part 214. The test patterns and the parameter files saved in the measurement condition file storing part 214 can be read out from the measurement condition file storing part 214 when requested, and supplied to the user interface section 200. Therefore, they are usable when parameters and their set values are to be inputted in subsequent benchmarks.

Every time the benchmark of one test pattern is completed, the result storing part 215 stores execution results of the benchmark (CPU operating ratio, processing response time, and so on) collected from the mail server 103 and the client terminals 104 by a later-described result collecting part 225 in the execution control section 220.

The execution control section 220 is composed of a server control part 221, a client control part 222, and the result collecting part 225, and it controls the execution of the benchmark in the information processing system 102.

The server control part 221 is supplied with the parameter file of the test pattern to be executed from the test pattern control part 211 in the managing section 210 and instructs hardware configuration, initial state setting, and so on to the mail server 103 based on the supplied parameter file when the benchmark is executed.

The client control part 222 controls the client terminal 104 when the benchmark is executed and has an execution control data outputting part 223 and a process control part 224.

The execution control data outputting part 223 supplies the client terminal 104 with the parameter file of the test pattern to be executed which is supplied from the test pattern control part 211 as execution control data. Accordingly, the client terminal 104 generates the virtual process based on the parameter file supplied as the execution control data. Incidentally, the execution control data outputting part 223 may generate the virtual process to be executed in the client terminals 104 from the supplied parameter file to supply the client terminal 104 with data for the execution of the generated virtual process as the execution control data.

The process control part 224 controls the execution of the virtual process in the client terminal 104 based on the parameter file of the test pattern to be executed.

Every time the benchmark of one test pattern is finished, the result collecting part 225 collects the execution result (CPU operating ratio, processing response time, and so on) of the benchmark from the mail server 103 and the client terminal 104 to supply the collected execution result to the result storing part 215 in the managing section 210 for storage.

Next, the operation will be explained.

Figure 3:
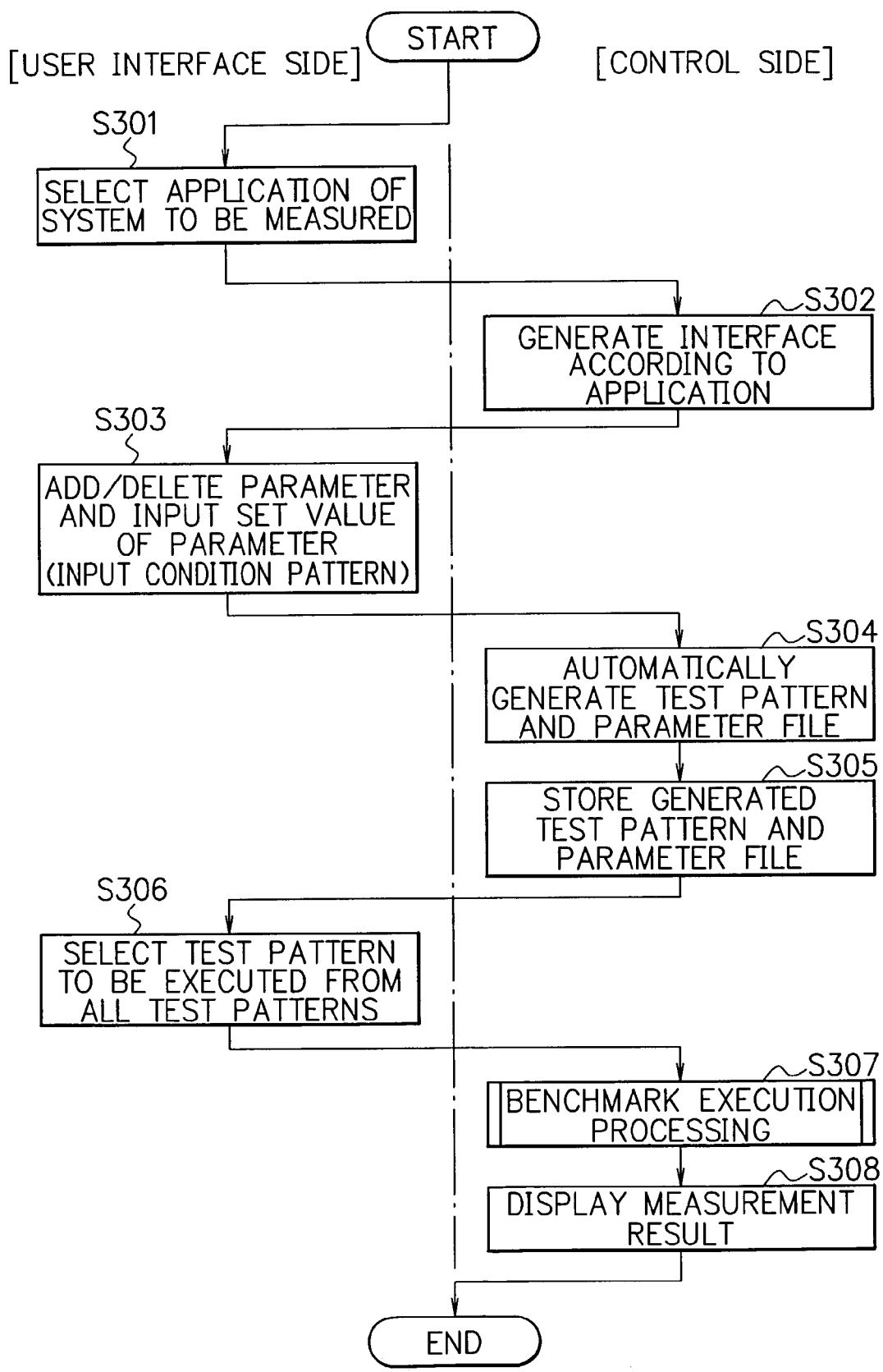
FIG. 3 is a flow chart showing the processing operation of the performance evaluation system.

FIG. 3 is a flow chart showing the processing operation of the performance evaluation system shown in FIG. 1

First, when the processing operation is started, the user interface control part 201 displays the application selection screen (test selection screen) on the display part 203 and requests the selection of application to be an object of the performance measurement in the information processing system 102 in Step S301. On the application selection screen, selectable application names are displayed as a list, for example, by means of GUI (graphic user interface) such as a list box.

The operator selects the application using the inputting part 204 from the application names displayed as a list. For example, the operator selects 'mail' as the application when the application to be measured in the information processing system 102 relates to electronic mails. Similarly, the operator selects 'web' when the application to be measured relates to a web, and selects 'database' when it relates to a database.

Next, in Step S302, the user interface generating part 202 generates the contents (input items and so on) of the condition input screen, which is an interface, according to the application selected in Step S301.

Specifically, the user interface generating part 202 classifies the parameters (items) for the benchmark for which the input of the set values through the condition input screen is requested, into parameters dependent on the server (a parameter group of a server condition), and parameters dependent on the client (a parameter group of a client condition), parameters dependent on the application. The parameters dependent on the application are further classified into parameters of a transaction relevant to the processing contents in the information processing system 102 (a parameter group of a transaction condition) and parameters of workload relevant to load (a parameter group of a workload condition).

When the user interface generating part 202 generates the interface according to the selected application, the common parameters dependent on the server and the common parameters dependent on the client are used irrespective of the selected application. Meanwhile, the parameters dependent on the application (the parameters of the transaction and the parameters of the workload) are changed to appropriate parameters (items) according to the selected application. However, the display form on the condition input screen, the basic input method, and the like are not changed, only the item names of the parameters dependent on the application being changed.

For example, when the selected application is 'mail', the user interface generating part 202 designates mail transmission, mail receipt (by a pop protocol), mail receipt (by an IMP protocol), and the like as the parameters of the transaction. Further, the user interface generating part 202 designates, as the parameters of the workload, the data size of one electronic mail, access interval (time) by the same user, the number of users having electronic mails at the instant when the benchmark execution is started, the number of these electronic mails, and the like.

The user interface control part 201 controls the display part 203 to display the condition input screen, which is the interface, according to the selected application.

In Step S303, the operator adds/deletes a parameter for the benchmark and inputs the set values of the parameters using the inputting part 204 according to the condition input screen displayed on the display part 203. Then, when the parameter deletion/addition and the input of the set values of the parameters are completed, the parameters and the inputted set values are supplied to the test pattern control part 211 in the managing section 210.

Figure 4:
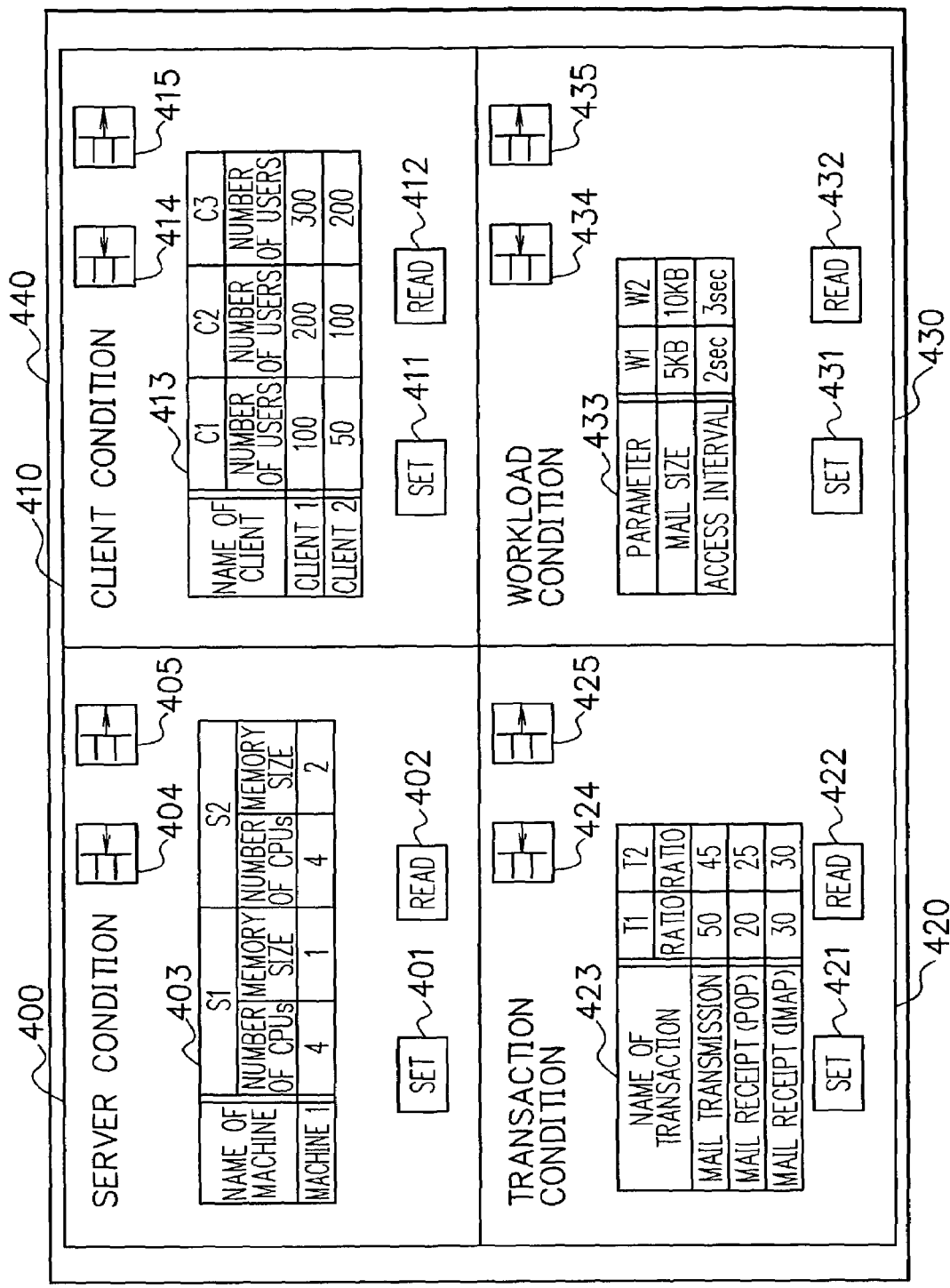
FIG. 4 is a view showing an example of a condition input screen.

FIG. 4 is a view showing an example of the condition input screen.

Note that FIG. 4 shows the condition input screen after the set values of the parameters for the benchmark are inputted thereon.

As shown in FIG. 4, the condition input screen 440 consists of four windows, namely, a server condition input window 400 displaying the parameter group of the server condition, a client condition input window 410 displaying the parameter group of the client condition, a transaction condition input window 420 displaying the parameter group of the transaction condition, and a workload condition input window 430 displaying the parameter group of the workload.

The server condition input window 400 is provided with a set button 401 and a read button 402. Through operator's operation of the inputting part 204 to press (click) the set button 401, the inputted parameters and set values which are displayed on a parameter display part 403 are set, in other words, supplied to the test pattern control part 211 in the managing section 210.

Further, through the operation of the inputting part 204 to press (click) the read button 402, parameters and their set values set in the past and stored in the measurement condition file storing part 214 as a repository are read to be displayed on the parameter display part 403. When the parameters and their set values set in the past are reused through the use of the read button 402, the input work of the parameters and their set values using the inputting part 204 can be reduced. This can prevent the occurrence of input mistakes and the like even when the confirmation work is simplified.

The server condition input window 400 is further provided with a row insert button 404 and a row delete button 405. When a parameter is to be added, one row is added to the parameter display part 403 by pressing (clicking) the row insert button 404. Similarly, when a parameter is to be deleted, a row to be deleted is selected and the row delete button 405 is pressed (clicked) so that the row selected from the parameter display part 403 is deleted.

The parameter display part 403 is a part displaying the parameters and their set values of the server condition in a tabular form. In the parameter display part 403, the server name 'machine 1' is inputted as a parameter and the number of CPUs and the memory size of the server 'machine 1' used in the benchmark are inputted as the set values.

In other words, as for the server condition, the server name (parameter) 'machine 1' constitutes the parameter group, the number of CPUs '4' and the memory size '1 GB' as the set values of the server name 'machine 1' constitute a condition pattern S1, and the number of CPU's '4' and the memory size '2 GB' as the set values constitute a condition pattern S2. Here, in the first embodiment, since only one mail server 103 is provided, only the set values for the server name 'machine 1' are inputted. However, when a plurality of servers are provided, it is possible to input a plurality of server names and input the set values for the respective servers.

Each of the client condition input window 410, the transaction condition input window 420, and the workload condition input window 430 is also provided with a set button 411, 421, and 431, respectively; a read button 412, 422, and 432, respectively; a row insert button 414, 424, and 434, respectively; and a row delete button 415, 425, and 435, respectively, similarly to the server condition window 400. Note that the functions of the set button, the read button, the row insert button, and the row delete button provided in each of the windows 410, 420, 430 are the same as the functions of the respective buttons provided in the server condition window 400, and therefore, the explanation thereof will be omitted.

Further, on each of respective parameter display parts 413, 423, 433 of the client condition input window 410, the transaction condition input window 420, and the workload condition input window 430, the parameters and their set values are also displayed in a tabular form irrespective of application, similarly to the server condition window 400, and a parameter group and condition patterns (client conditions C1, C2, C3, transaction conditions T1, T2, workload conditions W1, W2) are formed similarly to the server condition.

Incidentally, the ratios of the transactions, which are to be inputted for the condition patterns of the transaction condition, may be inputted in percentage or in decimal fraction. Even when the ratios of the transactions are inputted in decimal fraction, processing to convert them to percentage is executed in executing the benchmark.

Further, in FIG. 4, the condition input screen 440 is shown which is divided into four portions, namely, the input windows 400, 410, 420, 430 for the server condition, the client condition, the transaction condition, and the workload condition respectively, but only the windows on which the input of the set values of the parameters is required may be displayed or only one window may be displayed, not limited to the four-divided condition input screen 440.

Moreover, in FIG. 4, a column insert button for adding one column to the parameter display part when a condition pattern is to be added, and a column delete button for deleting a column selected from the parameter display part when a condition pattern is to be deleted may be provided, though not shown, in each of the windows 400, 410, 420, 430, similarly to the row insert button and the row delete button.

Returning to FIG. 3, in Step S303, when the set buttons of all the condition input windows are pressed and all the parameters and the set values (condition patterns) are supplied to the test pattern control part 211, the test pattern generating part 212 in the test pattern control part 211 automatically generates all the combinations of all the condition patterns as the test patterns from the condition patterns of the different parameter groups in Step S304. Further, the parameter file generating part 213 in the test pattern control part 211 generates the parameter files corresponding to all the test patterns respectively, similarly to the test pattern generating part 212.

Consequently, the test patterns including all the combinations of the inputted condition patterns, and the parameter files corresponding to these test patterns are generated respectively, the parameter files consisting of the set values of the parameters. In step S305, the test pattern control part 211 stores in the measurement condition file storing part 214 the test patterns and the parameter files generated in Step S304 respectively.

Next, in Step S306, the test pattern control part 211 makes a list of all the test patterns generated in Step S304 to control the display part 203 to display the test pattern selection screen as shown in FIG. 5 via the user interface control part 201. The operator selects a test pattern for which the benchmark is to be executed, from all the test patterns displayed on the test pattern selection screen through the use of the inputting part 204, and instructs the test pattern control part 211 to start executing the benchmark.

FIG. 5 is a view showing an example of the test pattern selection screen.

As shown in FIG. 5, on the test pattern selection screen, all the combinations of the condition patterns set for the respective parameter groups, namely, all the test patterns, are displayed in a two dimensional manner of X-series condition patterns and Y-series condition patterns by appropriately combining the plural parameter groups. FIG. 5 shows an example in which the condition patterns (three types) of the client condition in FIG. 4 are defined as the X-series condition patterns, and the condition patterns (12 types) in which the condition patterns of the server condition, the transaction condition, and the workload condition are combined are defined as the Y-series condition patterns.

Incidentally, the combinations of the plural parameter groups when all the test patterns are organized in the two-dimensional manner for displaying them as the test pattern selection screen may be generated in such a manner that the test pattern control part 211 automatically combines optional parameter groups or may be generated in such a manner that the operator can instruct the combinations by using the inputting part 204 and the test pattern control part 211 combines the parameter groups according to the instruction.

On the test pattern selection screen displayed in the tabular form, each of intersection parts of the X-series condition patterns and the Y-series condition patterns corresponds to one test pattern. Further, on the test pattern selection screen, a check box provided in each of the intersection parts of the X-series condition patterns and the Y-series condition patterns is intended for use in selecting whether or not the benchmark of the test pattern indicated by this intersection part is to be executed. When the check box has a check mark (is selected), it indicates that the benchmark of this test pattern is to be executed. When the check box does not have a check mark (is not selected), it indicates that the benchmark of this test pattern is not to be executed.

Note that the test pattern selection screen is displayed in the state in which all the check boxes have check marks at the start of the display of the test pattern selection screen. This makes it possible to avoid that the benchmark to be executed is not executed by mistake due to the oversight in checking the check box. An execution button 501 is intended for use in instructing the execution start of the benchmark.

Returning to FIG. 3, in Step S306, when the operator carries out the selection/non-selection operation of the check boxes on the test pattern selection screen using the inputting part 204 to press the execution button 501, the procedure proceeds to Step S307 so that the execution start of the benchmark is instructed to the test pattern control part 211. The test pattern control part 211, when receiving the instruction of the execution start of the benchmark, starts benchmark execution processing for the information processing system 102. This benchmark execution processing will be described later.

When the benchmark execution processing in Step S307 is completed, the user interface control part 202 reads the measurement result of the benchmark executed in Step S307 from the result storing part 215 to control the display part 203 to display the read measurement result in a predetermined form in Step S308. This is the completion of the processing operation of the performance evaluation system.

Figure 6:
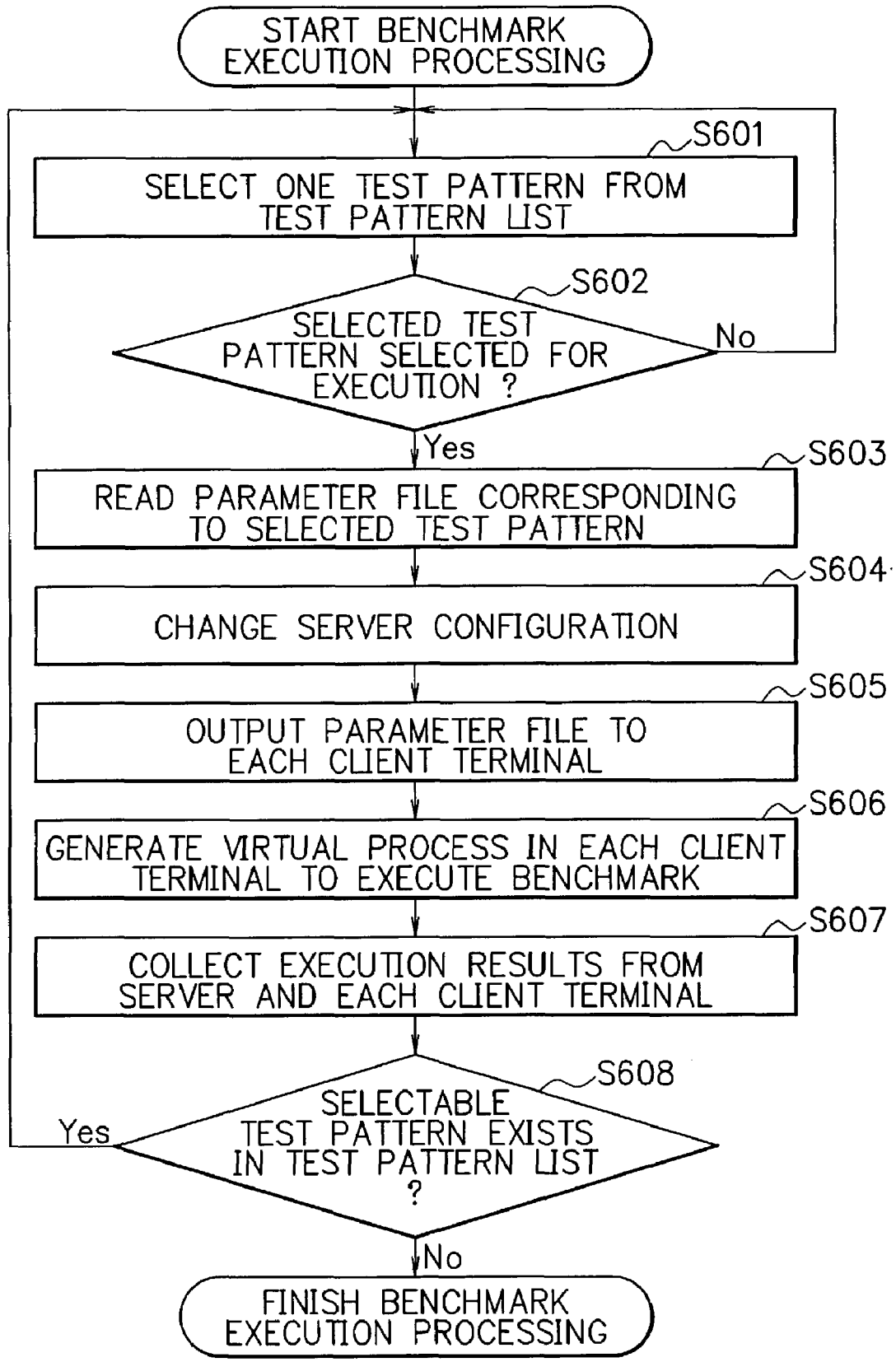
FIG. 6 is a flow chart showing the operation of benchmark execution processing in detail.

FIG. 6 is a flow chart showing the operation of the benchmark execution processing shown in FIG. 3 in detail.

In the benchmark execution processing, first in Step S601, the test pattern control part 211 selects one test pattern from the list of all the test patterns prepared based on the inputted condition patterns. The selection of the test pattern in Step S601 is performed in such a manner that the test pattern not previously selected in the list of all the test patterns are selected one by one.

Next, in Step S602, the test pattern control part 211 judges whether or not the test pattern selected in Step S601 is selected for execution, in other words, whether or not the check box is checked on the test pattern selection screen as shown in FIG. 5. When, as a result of the above-mentioned judgment, the test pattern control part 211 judges that the test pattern selected in Step S601 is selected for execution, it proceeds to Step S603 while returning to Step S601 when it judges that this test pattern is not selected for execution.

In Step S603 to which the test pattern control part 211 proceeds when it judges that the test pattern selected in Step S601 is selected for execution, the test pattern control part 211 reads the parameter file corresponding to this test pattern. The test pattern control part 211 further supplies the read parameter file to each of the server control part 221 and the client control part 222.

Next, in Step S604, the server control part 221 instructs the mail server 103 to change server configuration based on the parameter file supplied thereto in Step S603. The mail server 103, when receiving the instruction to change the server configuration from the server control part 221, changes the server configuration according to the instruction.

The instruction of the change in the server configuration given in this Step S604 can also instruct the change in hardware configuration (for example, the number of CPUs used, memory size, and the like), not limited to the change in software configuration (for example, in the case of the electronic mail system, the number of electronic mails that it has at the start of the benchmark, and the like) of the mail server 103. In changing the hardware configuration, the server configuration is changed, for example, according to a switching instruction by software which controls the number of CPUs and memory size by outputting a predetermined command. Thus, the insertion/removal of a CPU and a memory is not performed in the mail server 103.

In Step S605, the execution control data outputting part 223 in the client control part 222 outputs the parameter file supplied in Step S603 to the client terminal 104 as execution control data. Then, in Step S606, the client terminal 104 generates the virtual process based on the supplied parameter file.

Further, the process control part 224 in the client control part 222 instructs the execution start of the virtual process to the client terminal 104 so that the client terminal 104 executes the virtual process generated based on the parameter file. By this operation, the benchmark of one test pattern is executed in the information processing system 102.

When the execution of the virtual process by the client terminal 104 is finished, in other words, when the benchmark of one test pattern is finished, the result collecting part 225 collects, in Step S607, the execution results (measurement results) from the mail server 103 and the client terminal 104 respectively to have the collected execution results stored in the result storing part 215.

Next, in Step S608, the test pattern control part 211 judges whether or not a selectable test pattern, namely, a test pattern not selected in Step S601, exists in the list of all the test patterns. When the judgment result indicates that the selectable test pattern exists, the procedure returns to Step S601. Then, the aforesaid processing in Steps S601 to S608 is repeated. The aforesaid processing in Steps S601 to S608 is repeated until there exists no selectable test pattern. In other words, the aforesaid processing in Steps S601 to S608 is repeated until all the test patterns displayed in the list of all the test patterns are selected so that the benchmarks of the test patterns selected for execution are automatically and successively executed.

Meanwhile, when there exists no selectable test pattern, namely, when the selection of all the test patterns is completed in the selection processing in Step S601, the benchmark execution processing is finished.

Next, the result display screen will be explained.

Figure 7A:
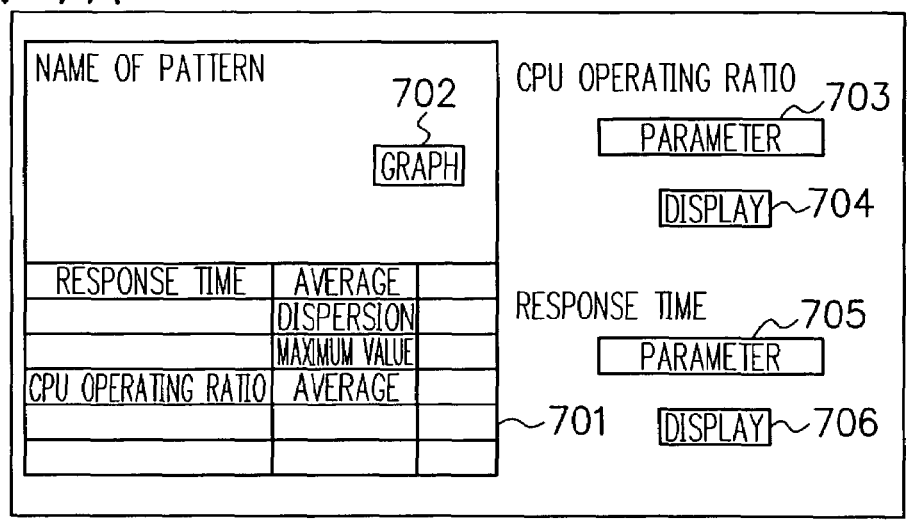
FIG. 7A to FIG. 7C are views showing an example of a result display screen.

FIG. 7A is a view showing an example of the result display screen for displaying the measurement result for each test pattern for which the benchmark is executed.

Figure 7B:
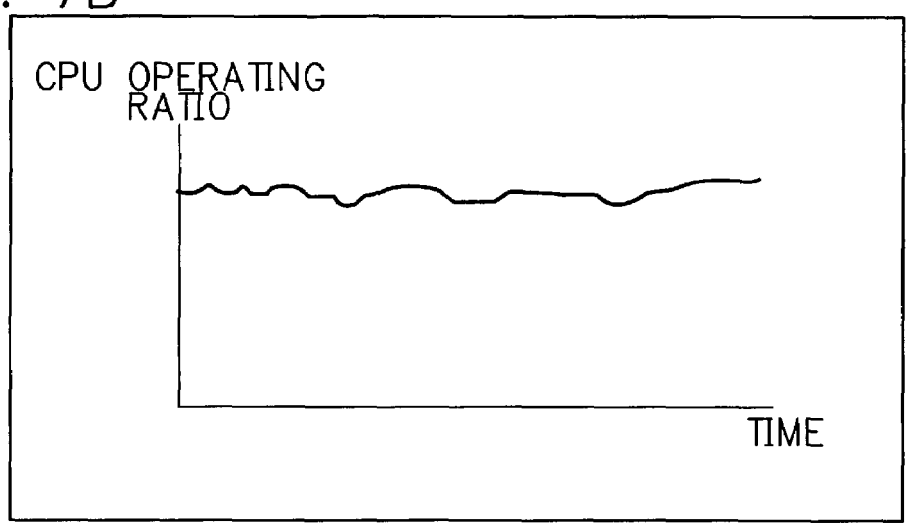

In FIG. 7A, 701 denotes a list showing the measurement result of one test pattern for which the benchmark is executed. In this list, the name of the test pattern, response time in the benchmark (average value, dispersion value, maximum value), the CPU operating ratio, and the like are displayed. The list 701 is also provided with a graph button 702 for displaying a graph of, for example, the CPU operating ratio. When the graph button 702 is pressed through the operation of the inputting part 204, the screen is switched to a result display screen for displaying a graph of the CPU operating ratio as shown in FIG. 7B. Note that in FIG. 7B, the horizontal axis shows the time from the execution start of the benchmark and the vertical axis shows the CPU operating ratio.

In the performance evaluation system in the first embodiment, the benchmarks using the test patterns selected from all the test patterns are automatically and successively executed. In addition, the measurement results of the benchmarks are stored in the result storing part 215. Hence, the benchmarks using the plural test patterns in which only a set value of a certain parameter is varied can be easily executed to obtain the measurement results of the benchmarks.

Here, the result display screen shown in FIG. 7A is provided with, in addition to the aforesaid list 701, display buttons 704, 706 for use in displaying the change in the measurement results (CPU operating ratio and response time in FIG. 7A) in response to the change of the set value of one parameter in the test patterns.

For example, when the change in the CPU operating ratio in response to the change in the number of used CPUs is to be displayed, the operator selects the 'the number of CPUs' in a list box 703 which is intended for use in designating a parameter to be changed, using the inputting part 204, and thereafter, presses the display button 704. At this time, when there exists a test pattern in which only the number of CPUs is different in the set values of the parameters from that in the test pattern whose measurement result is displayed in the list 701, the user interface control part 201 reads from the result storing part 215 the measurement result of the benchmark using the test pattern which is different only in the number of CPUs.

Figure 7C:
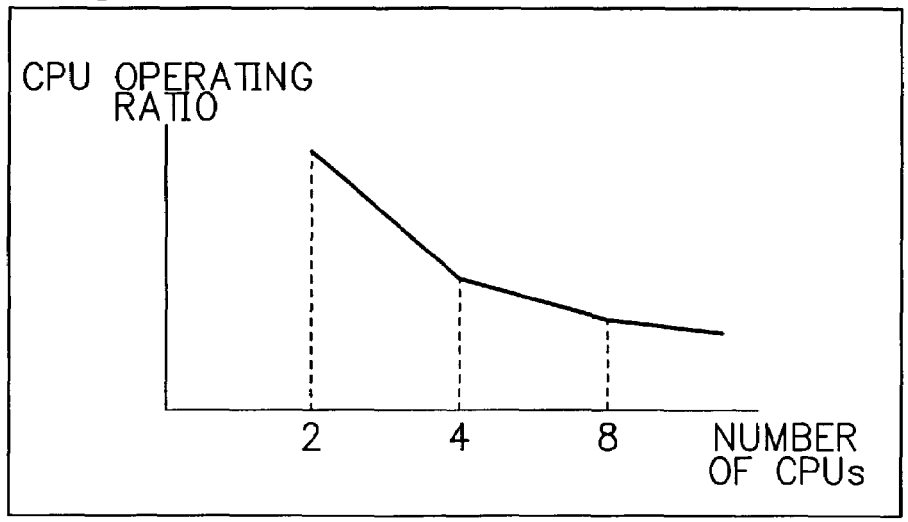

The user interface control part 201 further displays a graphed measurement result of the benchmark using the test pattern which is different only in the number of CPUs. In the graph, the parameter whose set value is to be varied is taken on the horizontal axis as shown in FIG. 7C.

Incidentally, when the change in the response time in response to the change in the set value of one parameter is to be displayed, it is achieved through the same operation as in displaying the change in the CPU operating ratio, using a list box 705 and a display button 706, and therefore, the explanation thereof will be omitted.

As is explained in detail hitherto, according to the first embodiment, the condition input screen on which the operator adds/deletes a parameter of the benchmark and inputs the set values is divided into the portions for the input of conditions relevant to the server condition, the client condition, and the application, and the portion for the condition relevant to the application is further divided into portions for the input of the transaction condition and the workload condition. Further, the parameter display parts to which the parameters and the set values of the parameters are actually inputted are displayed in a tabular form. This enables the addition/deletion of a parameter field and a set value input field, thereby enabling the simultaneous setting of a plurality of set values for one parameter. The parameter contents of the server condition and the client condition do not vary depending on application. Though the parameter contents of the transaction condition and the workload condition relevant to application are changed according to application, the basic form of the tabular form display is the same irrespective of application.

This enables the operator to input an optional number of the set values for each parameter simultaneously to eliminate the necessity of inputting the set values every time one benchmark is executed. Consequently, the operator can input the set values of the parameters very easily. Further, since the parameter field and the set value input field can be added/deleted, it is possible to display only the parameter whose set value is to be varied, thereby inputting the set values thereof.

Moreover, in the first embodiment, the test patterns, which are all the combinations of the condition patterns of the different parameter groups, and the corresponding parameter files are generated in the test pattern control part 211 based on the parameters and the set values (condition patterns) inputted via the condition input screen. Further, the test pattern to be executed is selected from all the test patterns via the test pattern selection screen and the benchmark is executed in the information processing system 102.

Consequently, even with many parameters, it is possible to generate the combinations (test patterns) of all the set values only by inputting the set values for each parameter, and to easily select and execute the test pattern corresponding to the benchmark to be executed only by selecting the test pattern from the displayed test patterns via the test pattern selection screen without being accompanied by a large amount of input work. Further, the parameter files corresponding to the test patterns are supplied to the information processing system 102 in sequence from the test pattern control part 211 via the execution control section 220 to execute the benchmark, also by selecting the plural test patterns on the test pattern screen.

Moreover, even when the hardware configuration has to be changed when the benchmark is executed, the first embodiment is so structured that the hardware is controlled by a predetermined command to eliminate the necessity of the work of actual insertion/removal. Therefore, only by the operator's selection of the test pattern on the test pattern selection screen, the information processing system 102 executes the benchmarks automatically and successively using the plural test patterns. This can reduce labor required for the plural benchmarks and also shorten the time therefor compared with the conventional art.

Further, in the first embodiment, since the result storing part 215 for storing the execution results of the benchmarks is provided in the benchmark control unit, it is possible to accumulate the plural results of the executions in which the set values of the parameters are varied. This enables the analysis of necessary data for performance evaluation and sizing of a system to be measured.

Incidentally, in the above-described first embodiment, the electronic mail system is shown as an example of the information processing system 102 which executes the benchmark to measure the performance thereof. The present invention is, however, applicable also to, for example, a system having a database server and a system having a web server, not limited to the electronic mail system. In a different system, the operation and so on are the same as those in the electronic mail system, only items of conditions relevant to application on the condition input screen being different.

Moreover, in the first embodiment, the information processing system 102 constituted of the server 103 and the plural client terminals 104 is shown as an example of an object to be measured by the benchmark. However, one information processing apparatus provided with both an information processing function (server function) corresponding to the server and an information processing function (client function) corresponding to the client terminal may be an object to be measured.

Further, in the first embodiment, the benchmark control unit 101 is constituted of one device provided with the inputting part 204 and the display part 203. However, the same effect as in this embodiment is also obtainable in such a configuration, for example, that separate terminal devices are used as the inputting part 204 and the display part 203 and they are connected to the benchmark control unit via a communication means such as a network.

-Second Embodiment-

Next, a second embodiment of the present invention will be explained.

FIG. 8 is a block diagram showing a configuration example of a performance evaluation system to which a performance evaluation information managing device according to the second embodiment of the present invention is applied.

In FIG. 8, 800 denotes an execution control section, which is composed of a measurement condition input part 801, an execution control data generating part 802, and an execution control data outputting part 803.

The measurement condition input part 801 is a part to which inputted is a measurement condition (parameters, their set values, and so on) for a benchmark to be executed in an information processing system 810 to be measured (evaluated), which will be described later. The execution control data generating part 802 generates execution control data for the execution of the benchmark in the information processing system 810 based on the measurement condition inputted to the measurement condition input part 801. The execution control data outputting part 803 outputs to the information processing system 810 the execution control data generated by the execution control data generating part 802.

The information processing system 810 is an information processing system to be measured and executes processing according to the measurement condition for the benchmark. The information processing system 810 is composed of a server 811 and client terminals 812.

The server 811 provides a predetermined service to the client terminals 812. The server 811 also changes hardware configuration such as the number of CPUs that it has and memory size according to the execution control data supplied from the execution control section 800, and outputs the execution result (resource information such as the CPU operating ratio) to a result data managing section 820 when the benchmark under one measurement condition is finished.

The client terminals 812 are terminals receiving the service provided by the server 811. Each of the client terminals 812 generates a virtual process based on the execution control data supplied from the execution control section 800, executes processing such as access to the server 811 according to the generated virtual process, and outputs the execution result (response time of the server 811 and the like) to the result data managing section 820 when the benchmark under one measurement condition is finished.

Note that the virtual process may be generated by the execution control data generating part 802 in the execution control section 800 instead of by the client terminal 812. In that case, data for executing the virtual process is supplied from the execution control section 800 as the execution control data.

Here, the server 811 and the client terminals 812 are communicatably connected to each other via a network 813 such as LAN (Local Area Network) or WAN (Wide Area Network) through a not-shown network interface provided therein, respectively. Incidentally, in FIG. 8, the information processing system 810 constituted of one server 811 and two client terminals 812 is shown as an example, but any number of the servers and any number of the client terminals may be provided.

The result data managing section 820 is composed of a result obtaining part 821, a result storing part 822, a feature amount extracting part 823, a result database (hereinafter, referred to as a 'result DB') 824, a search executing part 825, a search condition input part 826, and a search result outputting part 827.

The result obtaining part 821 obtains the execution results (CPU operating ratio, processing response time, and the like) of the benchmark from the server 811 and the client terminals 812 every time the benchmark under one measurement condition is finished in the information processing system 810. Further, when a value corresponding to a feature amount as performance evaluation information extracted in the feature amount extracting part 823, which will be described later, is immediately obtainable from the obtained execution results of the benchmark (when the feature amount is included in the obtained execution results of the benchmark as information), the result obtaining part 821 outputs the feature amount to the result DB 824. The above-mentioned result obtaining part 821 constitutes a result obtaining means of the present invention.

The result storing part 822 is a part for storing the execution results of the benchmark which are obtained by the result obtaining part 821. Note that the execution results of the benchmark which are stored in the result storing part 822 are detailed execution results of the benchmark obtained in sequence each time one processing (for example, an access to the server 811 or the like) is performed at the execution of the benchmark. The feature amount extracting part 823 extracts (calculates) the feature amount as the performance evaluation information from the detailed execution results of the benchmark which are stored in the result storing part 822 to output the extracted feature amount to the result DB 824. The above-mentioned feature amount extracting part 823 constitutes an information extracting means of the present invention.

Figure 9:
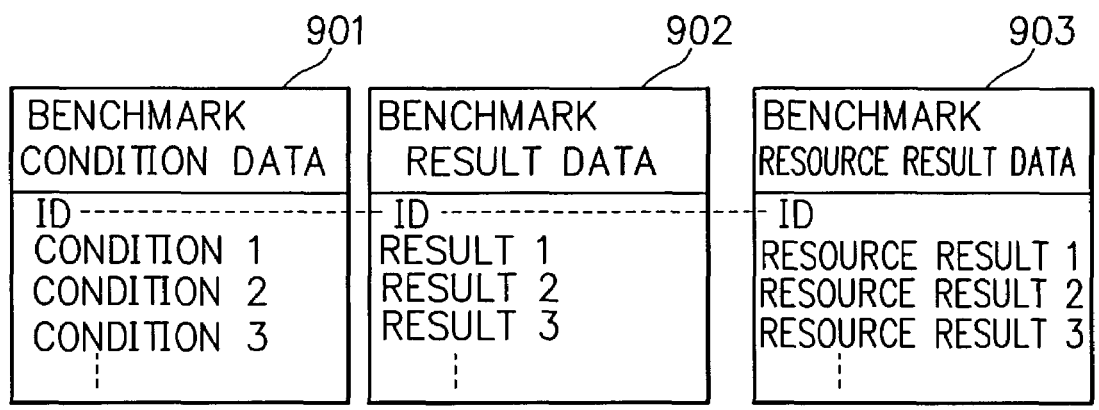
FIG. 9 is a view showing an example of the data structure in a result database.

The result DB 824 stores and accumulates the measurement condition for the benchmark and the feature amount obtained from the execution results on a storage medium such as a hard disk provided therein. Specifically, the result DB 824 stores and accumulates the measurement condition for the benchmark supplied from the measurement condition input part 801, and the feature amount supplied from the result obtaining part 821 or the feature amount extracting part 823 and obtained from the execution results of the benchmark under this measurement condition, in such a manner that the measurement condition and the feature amount are linked (related) to each other by one ID (identification number) as shown in FIG. 9. The above-mentioned result DB 824 constitutes an information storing means of the present invention.

FIG. 9 is a view showing an example of the data structure in the result DB 824.

In FIG. 9, 901 denotes benchmark condition data, which is data relating to the measurement condition for the benchmark (the number of CPUs, the number of users, access frequency, and the like). 902 and 903 denote benchmark result data and benchmark resource result data respectively, which are data relating to the feature amount obtained from the execution results of the benchmark. The benchmark result data 902 is result data relating to actual processing such as response time and throughput (processing amount per unit time) included in the feature amount obtained from the execution results of the benchmark. The benchmark resource result 903 is result data relating to the usage state of a resource (hardware resource) at the time of the benchmark execution, such as the CPU operating ratio and the like included in the feature amount obtained from the execution results of the benchmark.

As shown in FIG. 9, the measurement conditions of the benchmark and the feature amounts obtained from the execution results of the benchmark are sorted into one set of the benchmark condition data (condition 1, condition 2, condition 3, . . . ), the benchmark result data (result 1, result 2, result 3, . . . ), and the benchmark resource result data (resource result 1, resource result 2, resource result 3, . . . ), by each benchmark under one measurement condition. The data management is made in such a manner that one set of the benchmark condition data, the benchmark result data, and the benchmark resource result data is assigned the same ID for each benchmark under one measurement condition.

Note that the set of the measurement condition for the benchmark and the feature amounts obtained from the execution results under this measurement condition which are linked by one ID is hereinafter referred to as performance evaluation data.

Returning to FIG. 8, based on a search condition inputted from an external part via a search condition input part 826, the search executing part 825 retrieves the performance evaluation data satisfying the search condition from the result DB 824 to output the search result to the external part via the search result outputting part 827. The above-mentioned search executing part 825 constitutes an information search means of the present invention.

Incidentally, in FIG. 8 mentioned above, the result storing part 822 for storing the detailed execution results of the benchmark is provided in the result data managing section 820, but instead of providing the result storing part 822 in the result data managing section 820, the detailed execution results of the benchmark may be individually saved on an external storage medium (a hard disk, a magnetic tape, or the like) so that the external storage medium supplies the detailed execution results of the benchmark to the feature extracting part 823.

Further, when the value corresponding to the feature amount extracted in the feature extracting part 823 is always included in the execution results of the benchmark which are obtained by the result obtaining part 821, neither the result storing part 822 nor the feature amount extracting part 823 needs to be provided in the result data managing section 820.

Next, the operation of the performance evaluation system shown in FIG. 8 mentioned above will be explained.

First, the performance evaluation data saving operation of executing the benchmark and linking the measurement condition and the feature amount as the performance evaluation information obtained from the execution results to store and accumulate them in the result DB 824 will be explained.

Next, the performance evaluation data search operation of searching the performance evaluation data stored and accumulated in the result DB 824 will be explained.

<Performance Evaluation Data Saving Operation>

First, the operator for the benchmark uses a not-shown inputting device or the like to input the measurement condition (parameters, their set values, and so on) for the benchmark to be executed. The operator uses the inputting device or the like to input 'the number of users'="100", 'access frequency'="2", 'the number of CPUs'="2", and so on for the parameters of the measurement condition such as, for example, the number of users', 'access frequency', 'the number of CPUs', and so on. The measurement condition inputted by the operator through the use of the inputting device or the like is supplied to the measurement condition input part 801.

The measurement condition input part 801 supplies the supplied measurement condition to the execution control data generating part 802 and the result DB 824. The execution control data generating part 802 supplied with the measurement condition generates the execution control data for the benchmark, which is supplied to the server 811 and the client terminals 812 respectively constituting the information processing system 810, based on the supplied measurement condition.

For example, when the measurement condition of 'the number of CPUs'="2" is supplied, the execution control data generating part 802 generates the execution control data for the server 811, instructing that hardware configuration should be so changed that the number of CPSs used for the benchmark execution processing is "2". When the measurement condition of, for example, 'the number of users'="100" and 'access frequency'="2" is supplied, the execution control data generating part 802 generates the execution control data for each of the client terminals 812, the execution control data controlling the server 811 to execute processing corresponding to the measurement condition in which the user number is "100" and the access frequency is "2" by all the processing requests from all the client terminals 812 to the server 811.

The execution control data for the server 811 and the client terminals 812 generated by the execution control data generating part 802 respectively are supplied to the server 811 and the client terminals 812 by the execution control data outputting part 803 respectively. The server 811 changes its own hardware configuration and performs prescribed initial setting according to the supplied execution control data. Each of the client terminals 812 generates the virtual process in the benchmark based on the supplied execution control data.

Further, when the execution control section 800 instructs the information processing system 810 to start the execution of the benchmark, the execution of the virtual process by each of the client terminals 812 is started so that the benchmark is executed in the information processing system 810.

When the execution of the virtual process by each of the client terminals 812 is finished, in other words, when the benchmark under one measurement condition is finished in the information processing system 810, the result obtaining part 821 obtains the execution results of the benchmark from the server 811 and the client terminals 812. The obtained execution results of the benchmark are supplied to the result storing part 822 and stored therein.

Next, the feature amount extracting part 823 extracts (calculates), from the execution results of the benchmark stored in the result storing part 822, the feature amounts such as the average value of response time, a dispersion value, the maximum value, a value of time required for a response to be returned at the probability of 90%, throughput, the CPU operating ratio, and the like. The feature amounts extracted by the feature amount extracting part 823 are supplied to the result DB 824.

Then, the measurement condition for the benchmark supplied from the measurement condition input part 801 and the feature amounts as the performance evaluation information obtained from the execution results in the feature amount extracting part 823 are stored in the result DB 824 as one set of performance evaluation data for each benchmark under one measurement condition. At this time, the performance evaluation data is stored in the result DB 824 in a saving form (format) as shown in FIG. 10.

Figure 10:
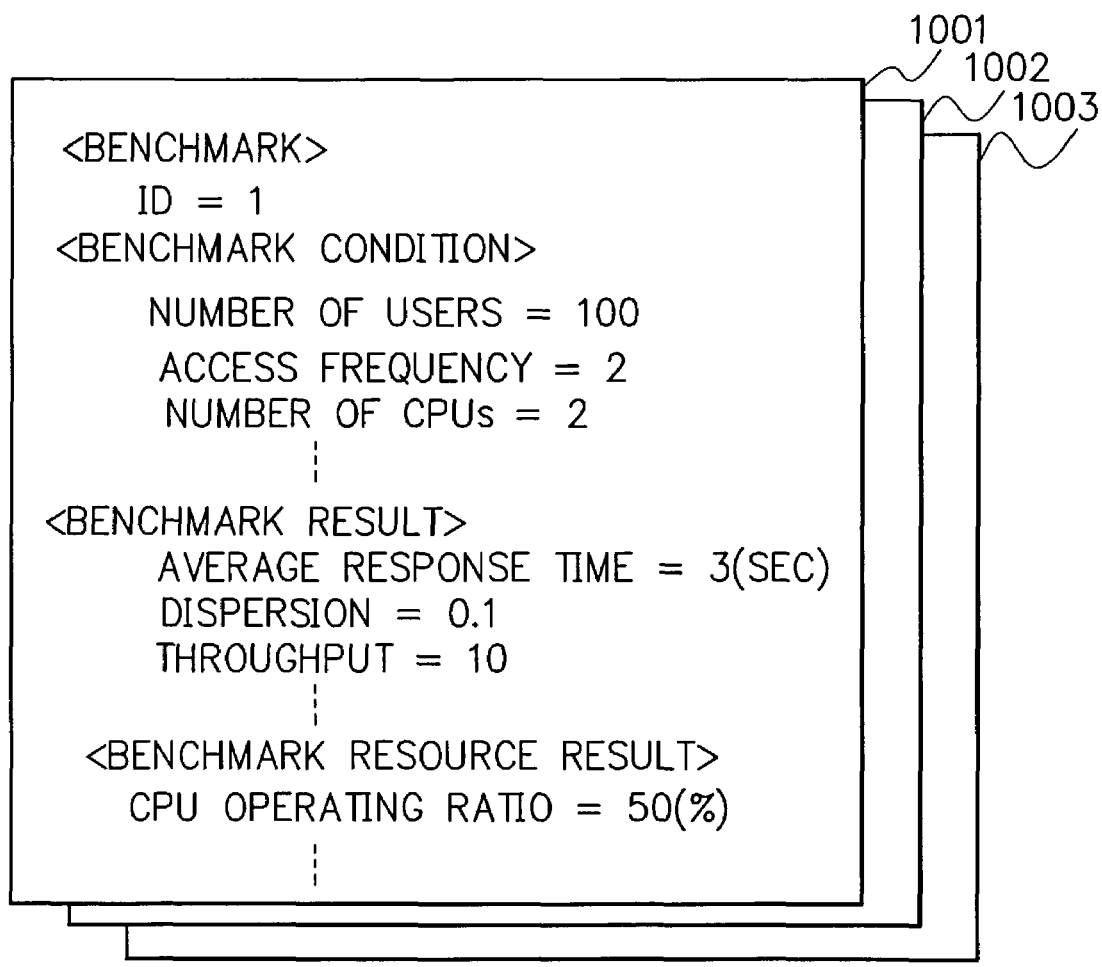
FIG. 10 is a view showing an example of a saving format of performance evaluation data.

FIG. 10 is a view showing an example of the saving format when the performance evaluation data is stored in the result DB 824. Each performance evaluation data 1001, 1002, 1003, . . . obtained from the benchmark is stored in the result DB 824 in such a predetermined format that one ID for data management assigned to each benchmark under one condition, the benchmark condition (the number of users, access frequency, the number of CPUs, and so on), the benchmark result (average response time, dispersion value, throughput, and so on), and the benchmark resource result (CPU operating ratio and so on) are written in parallel.

Incidentally, as described above, when the feature amounts are obtainable immediately from the execution results of the benchmark obtained by the result obtaining part 821, the measurement condition for the benchmark supplied from the measurement condition input part 801 and the feature amounts directly obtained from the execution results in the result obtaining part 821 may be stored as one set of performance evaluation data in the result DB 824.

The processing operation described above is repeated in the benchmarks under various measurement conditions inputted to the measurement condition input part 801 so that the performance evaluation data obtained by the benchmarks executed under the various measurement conditions are stored and accumulated in the common result DB 824.

<Performance Evaluation Data Search Operation>

Next, the performance evaluation data search operation of searching the performance evaluation data stored and accumulated in the result DB 824 will be explained.

First, the operator trying to search the performance evaluation data obtained by the benchmarks under various conditions respectively uses a not-shown inputting device or the like to input a search condition of the performance evaluation data so that the search condition is supplied to the search condition input part 826. As the search condition, the measurement condition for the benchmark may be inputted or a performance requirement for the information processing system may be inputted.

Next, the search condition input part 826 supplies the supplied search condition to the search executing part 825. In response to this operation, the search executing part 825 searches for and extracts the performance evaluation data matching the search condition from the result DB 824 to output the extracted performance evaluation data via the search result outputting part 827. The operator refers to the search result outputted from the search result outputting part 827 and displayed on a not-shown display device or the like.

For example, when "100 to 200" is inputted as the search condition for the number of users in the measurement condition of the benchmark, the search executing part 825 searches the result DB 824 for the benchmark condition data in which the number of users is 100 to 200. The search executing part 825 extracts from the result DB 824 the performance evaluation data having an ID assigned to the benchmark condition data in which the number of users matches the search condition (the benchmark condition data having the number of users matching the search condition, and corresponding benchmark result data and benchmark resource result data). Further, the search executing part 825 outputs the performance evaluation data in which the number of users matches the search condition as a search result. This enables the operator to refer to the benchmark result data and the benchmark resource result data outputted as the search result to estimate the performance of the information processing system.

Further, for example, when "within five seconds" is inputted as a search condition for the average response time as a performance requirement of the information processing system, the search executing part 825 searches the result DB 824 for the benchmark result data in which the average response time is within five seconds. The search executing part 825 extracts from the result DB 824 the performance evaluation data having an ID assigned to the benchmark result data in which the average response time is within five seconds. Further, the search executing part 825 outputs as a search result the performance evaluation data in which the average response time is within five seconds. This enables the operator to estimate hardware and so on to be provided in the information processing system by referring to the benchmark condition data outputted as the search result.

Incidentally, in FIG. 8 mentioned above, the performance evaluation system constituted of one execution control section 800, one information processing system 810, and one result data managing section 820 is shown as an example. The present invention, however, is not limited to this configuration, and the performance evaluation system may be constituted of a plurality of execution control sections 800-N, a plurality of information processing systems 810-N (N is a natural number), and one result data managing section 820, for example, as shown in FIG. 11.

Figure 11:
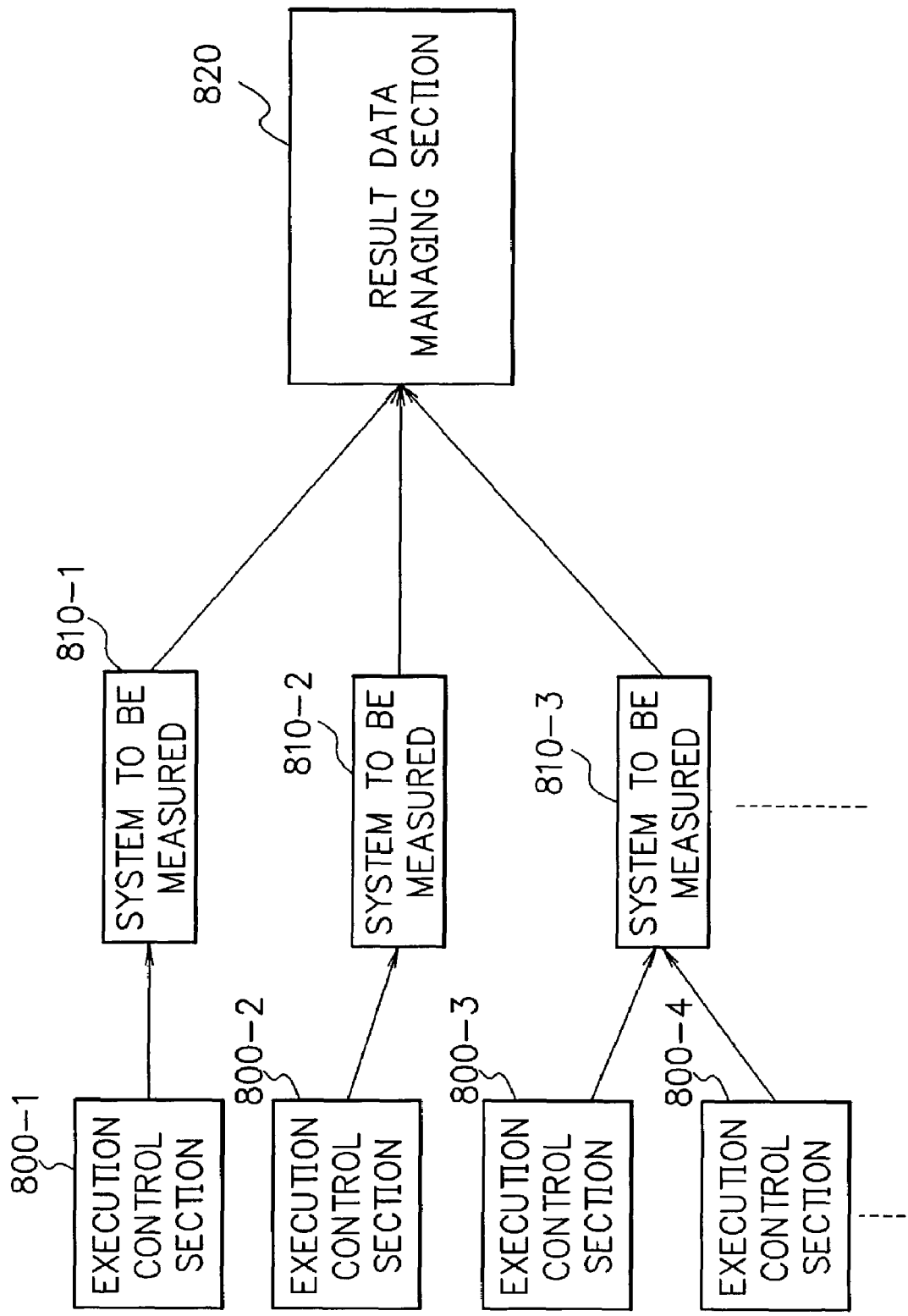
FIG. 11 is a block diagram showing a generally-adoptable configuration example of the performance evaluation system according to the second embodiment.

FIG. 11 is a block diagram showing a generally-adoptable configuration example of a performance evaluation system in the second embodiment.

In FIG. 11, each of the execution control sections 800-N (N is a natural number) is provided with the same function as that of the execution control section 800 shown in FIG. 8. The information processing systems 810-N (N is a natural number) are arbitrary information processing systems which execute benchmarks and supply execution results of the benchmarks to the result data managing section 820 according to execution control data supplied from the execution control sections 800-N, similarly to the information processing system 810 shown in FIG. 8.

The result data managing section 820, which is the result data managing section shown in FIG. 8 mentioned above, stores and accumulates the performance evaluation data of the benchmarks executed in the information processing systems 810-N respectively. In other words, the result data managing section 820 of the performance evaluation system in the second embodiment concentratedly manages the performance evaluation data obtained from the benchmarks executed by the plural information processing systems 810-N respectively, as shown in FIG. 11.

As explained in detail hitherto, according to the second embodiment, the result obtaining part 821 obtains the execution results of the benchmarks executed under various measurement conditions from the information processing systems 810, and the measurement conditions and the feature amounts as the performance evaluation information obtained from the obtained execution results are stored in the result DB 824 in such a manner that they are related to each other, being classified by each benchmark under one measurement condition.

Consequently, the performance evaluation data consisting of the measurement condition and the feature amounts as the performance evaluation information obtained respectively from the execution results of the benchmarks under these measurement conditions can be stored and accumulated in the result DB 824, being classified by each benchmark under one measurement condition. Therefore, the plural performance evaluation data respectively including the performance evaluation information obtained from the benchmarks under various measurement conditions can be concentratedly managed in the result DB 824. Therefore, the performance evaluation data of the benchmarks executed under various measurement conditions can be searched for and compared easily.

Further, such a structure is adopted that the performance evaluation data matching the search condition is searched for from the plural performance evaluation data stored in the result DB 824, and the performance evaluation data extracted based on the search result is outputted. This can facilitate the search of the performance evaluation data obtained from the benchmarks executed in the past. Moreover, when the set values of the parameters are changed to execute the plural benchmarks according to many measurement conditions presented by a client or the like, the performance evaluation data corresponding to these plural benchmarks are searched for respectively. This makes it possible to easily compare the obtained performance evaluation data.

For example, when the benchmark under a measurement condition only slightly different from that of a benchmark executed in the past (for example, by changing a measurement condition corresponding to application load or by changing a measurement condition corresponding to hardware configuration of the information processing system) is to be executed, the performance evaluation data in the benchmark executed in the past is retrieved for reference and comparison. This makes it possible to estimate and evaluate the performance evaluation data to be possibly obtained without executing the benchmark.

Moreover, the data structure of the result DB 824 is such a parallel data structure that the benchmark condition data, the benchmark result data, and the benchmark resource result data constituting the performance evaluation data are related to one another by one ID. This enables bi-directional search, and not only the constituent elements of the measurement condition but also the constituent elements of the performance evaluation information can be inputted as the search condition. Therefore, not only the search for the performance evaluation information obtained from the measurement condition for the benchmark but also the search for the measurement condition or the like from the performance evaluation information is made possible. This enables versatile utilization of the performance evaluation data stored in the result DB 824. Consequently, the configuration to be provided in the information processing system (hardware and the like) can be referred to by inputting a desired performance requirement or the like as the search condition.

Further, in storing the plural performance evaluation data in the result DB 824, the performance evaluation data are stored in the same storage format respectively. This further facilitates the search for the performance evaluation data matching the search condition and the comparison of the performance evaluation data using the search result.

-Third Embodiment-

Next, a third embodiment of the present invention will be explained.

In the benchmark execution for the purpose of comprehensively grasping the performance (the performance under various conditions) of the information processing system to be evaluated, it is very difficult to execute the benchmarks under all the benchmark measurement conditions in the information processing system to obtain the performance evaluation data. For this reason, conventionally, the benchmarks are executed in such a manner that an operator or the like carrying out the benchmarks determines such several (for example, five to six) measurement conditions that the performance evaluation data are obtained substantially at regular pitches within the range of roughly set measurement conditions under which the performance of the information processing system is to be measured. Further, when a measurement condition under which a detailed measurement is desired to be made again is found as a result of the organization and analysis of the execution results of the benchmarks after all the benchmarks under the determined measurement conditions are finished, the benchmark under this measurement condition is executed.

In the above-described conventional method, however, when several measurement conditions under which the performance evaluation data are obtained substantially at regular pitches are determined to execute the benchmarks, information serving as an index for determining the measurement conditions is not available. Hence, there exists such a problem that the benchmarks have to be executed even if only a small change in performance in the information processing system is exhibited under these measurement conditions and as a result, only a small amount of information is obtainable with respect to performance. Moreover, there exists such a problem that the measurement condition under which the detailed measurement is to be made again is not known until the execution results are organized and analyzed after the benchmarks under all the measurement conditions are finished. This gives rise to such a problem that it requires a wasteful labor and a lot of time to comprehensively grasp and evaluate the performance of the information processing system in the above-described manner.

So, in the third embodiment of the present invention, the performance evaluation information managing device according to the second embodiment described above is utilized to enable automatic presentation of a recommended measurement condition of the benchmark.

Figure 12:
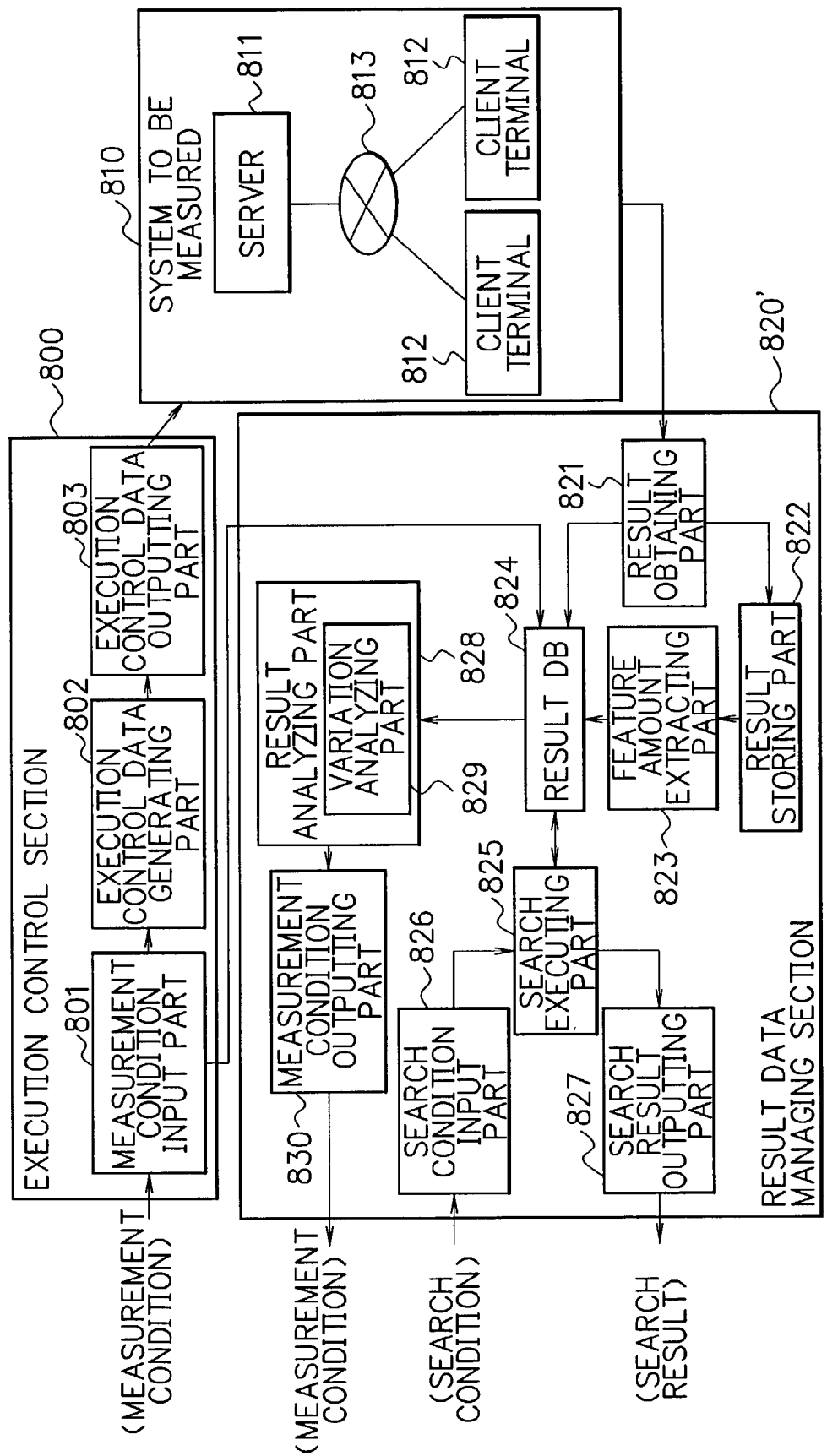
FIG. 12 is a block diagram showing a configuration example of a performance evaluation system according to a third embodiment of the present invention.

FIG. 12 is a block diagram showing a configuration example of a performance evaluation system to which a performance evaluation device according to the third embodiment of the present invention is applied. Note that, in this FIG. 12, the same reference numerals are used to designate blocks having the same functions as those of the blocks shown in FIG. 8, and the explanation having the same contents will be omitted. Further, the same reference numerals with an apostrophe (') added thereto are used to designate blocks having corresponding functions, though not identical, to those of the blocks shown in FIG. 8.

In FIG. 12, 820' denotes a result data managing section, which is constituted by additionally providing a result analyzing part 828 and a measurement condition outputting part 830 in the result data managing section 820 shown in FIG. 8 mentioned above.

The result analyzing part 828 includes a variation analyzing part 829, and it determines and outputs a recommended measurement condition for the benchmark (recommended measurement condition) for obtaining detailed performance evaluation data of the information processing system 810 based on the result of an analysis by the variation analyzing part 829. The variation analyzing part 829 analyzes the ratio of performance change in the information processing system 810 based on the performance evaluation data accumulated in the result DB 824. The measurement condition outputting part 830 is a part for externally outputting the recommended measurement condition determined and outputted by the result analyzing part 828. Here, the above-mentioned result analyzing part 828 constitutes a measurement condition providing means and the above-mentioned variation analyzing part 829 constitutes a variation analyzing means of the present invention.

Next, the operation of the performance evaluation system shown in FIG. 12 mentioned above will be explained.

Figure 13:
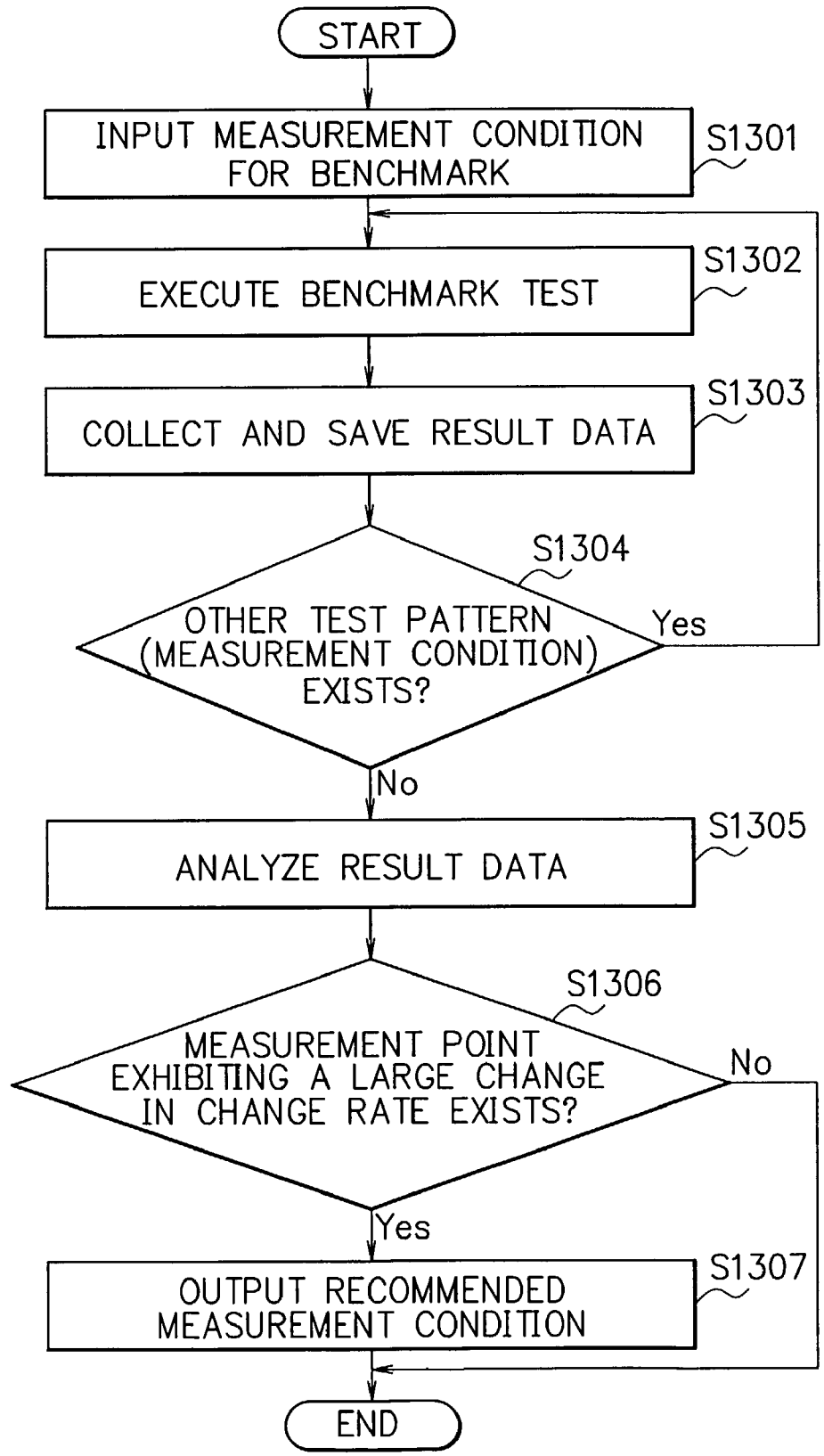
FIG. 13 is a flow chart showing the processing operation of the performance evaluation system according to the third embodiment.

FIG. 13 is a flow chart showing the processing operation of the performance evaluation system according to the third embodiment.

First, in Step S1301, an operator uses a not-shown inputting device or the like to input several (for example three to four) measurement conditions for the benchmarks within the range of the measurement conditions measurable in the information processing system 810 to be evaluated, and supplies the measurement conditions in sequence to the execution control data generating part 802 via the measurement condition input part 801. Incidentally, the measurement conditions to be inputted are arbitrary. For example, they may be determined at regular pitches, dividing the range of the measurement conditions or they may be determined based on the past experience of the operator. Alternatively, it is also suitable that the operator inputs only the minimum value and the maximum value of the measurement conditions and the execution control section 800 automatically divides the range therebetween in an arbitrary manner.

Then, the benchmark under the supplied measurement condition is executed (Step S1302), similarly to the performance evaluation data saving operation in the second embodiment described above. The execution results of the executed benchmark are collected and the performance evaluation data is stored and accumulated in the result DB 824 (Step S1303). This performance evaluation data saving operation (Step S1302, S1303) is repeated to execute the benchmarks under all the measurement conditions inputted in the above Step S1301.

Then, when the performance evaluation data are obtained after the execution of the benchmarks under all the measurement conditions inputted in the above Step S1301 is finished (in the case of No in Step S1304), the procedure proceeds to Step S1305.

Here, in accurately grasping the performance of the information processing system 810, it is the execution result of the benchmark under the measurement condition exhibiting change in performance change response and exhibiting a large change rate of performance (for example, a portion exhibiting a small curvature when a parameter change curve is depicted), that provides a large volume of information concerning the performance of the information processing system 810 (the execution result obtained from the executed benchmark has a significant meaning). Hence, in Step S1305, based on the performance evaluation data which are stored in the result DB 824 through the above-described operations in Steps S1301 to S1304, the variation analyzing part 829 automatically calculates the rate of change in the spotlighted performance (change rate of performance change) when the benchmarks are to be executed for the evaluation.

For example, based on the performance evaluation data, the variation analyzing part 829 calculates the variation in the spotlighted performance in each of the ranges between the plural measurement conditions under which the benchmarks are executed. The variation analyzing part 829 further calculates the change rate of performance change in each of the ranges between the measurement conditions based on the calculated change rate.

Next, in Step S1306, the result analyzing part 828 judges whether or not a measurement point exhibiting a large change rate exists among the change rates of performance change which are calculated in the variation analyzing part 829 in the above Step S1305. Here, it is also suitable that, for example, the result analyzing part 828 compares a predetermined reference value of the change rate of performance change and the change rate of performance change calculated by the variation analyzing part 829, thereby judging whether or not the change rate is large. Alternatively, it is also suitable that, for example, the change rates of performance change, which are calculated by the variation analyzing part 829, in the respective ranges between the measurement conditions, are compared with one another, thereby judging whether or not the change rate is large.

When the result of the above judgment leads to the judgment that there exists a measurement point exhibiting a large change rate of performance change, the result analyzing part 828 outputs, in Step S1307, a recommended measurement condition including a set value of a parameter at the above-mentioned measurement point exhibiting a large change rate of performance change, to an external part (for example, a display device or the like usable by the operator) via the measurement condition outputting part 830 to finish the processing. When, on the other hand, the result of the judgment in the above Step S1306 leads to the judgment that there exists no measurement point exhibiting a large change rate of performance change, the processing is also finished.

The above-described processing is repeated so that the performance evaluation data obtained under various measurement conditions are accumulated in the result DB 824, and the detailed and focused measurement of the point exhibiting a large change rate of performance change is made possible in the information processing system 810.

As is explained hitherto, according to the third embodiment, not only the effect obtained in the above-described second embodiment is obtainable, but also the measurement condition at the measurement point exhibiting a large change rate of performance change in the information processing system 810 to be evaluated is outputted as the recommended measurement condition based on the performance evaluation data stored in the result DB 824.

Consequently, focused measurement is made for the measurement point exhibiting a large change rate of performance change in the information processing system 810. On the other hand, measurement at rough pitches is made for measurement points exhibiting a small change rate of performance change. This makes it possible to measure the performance in the information processing system 810 with a small number of measurement conditions and with high efficiency.

Further, based on the performance evaluation data stored in the result DB 824, the variation analyzing part 829 automatically calculates the change rate of performance change in the information processing system 810 and the result analyzing part 828 judges whether or not the change rate of performance change is large. Consequently, the operator can obtain the measurement condition to be used for a subsequent measurement without organizing and analyzing the performance evaluation data by himself/herself. This can reduce the trouble of calculating the performance evaluation data and so on by the operator or the like.

Incidentally, in the above-described third embodiment, the result analyzing part 828 outputs the recommended measurement condition including the set value of the parameter at the measurement point exhibiting a large change rate of performance change to the external part via the measurement condition outputting part 830. However, only the set value of the parameter at the measurement point exhibiting a large change rate of performance change may be outputted together with the name of this parameter.

-Fourth Embodiment-

Next, a fourth embodiment of the present invention will be explained.

Figure 14:
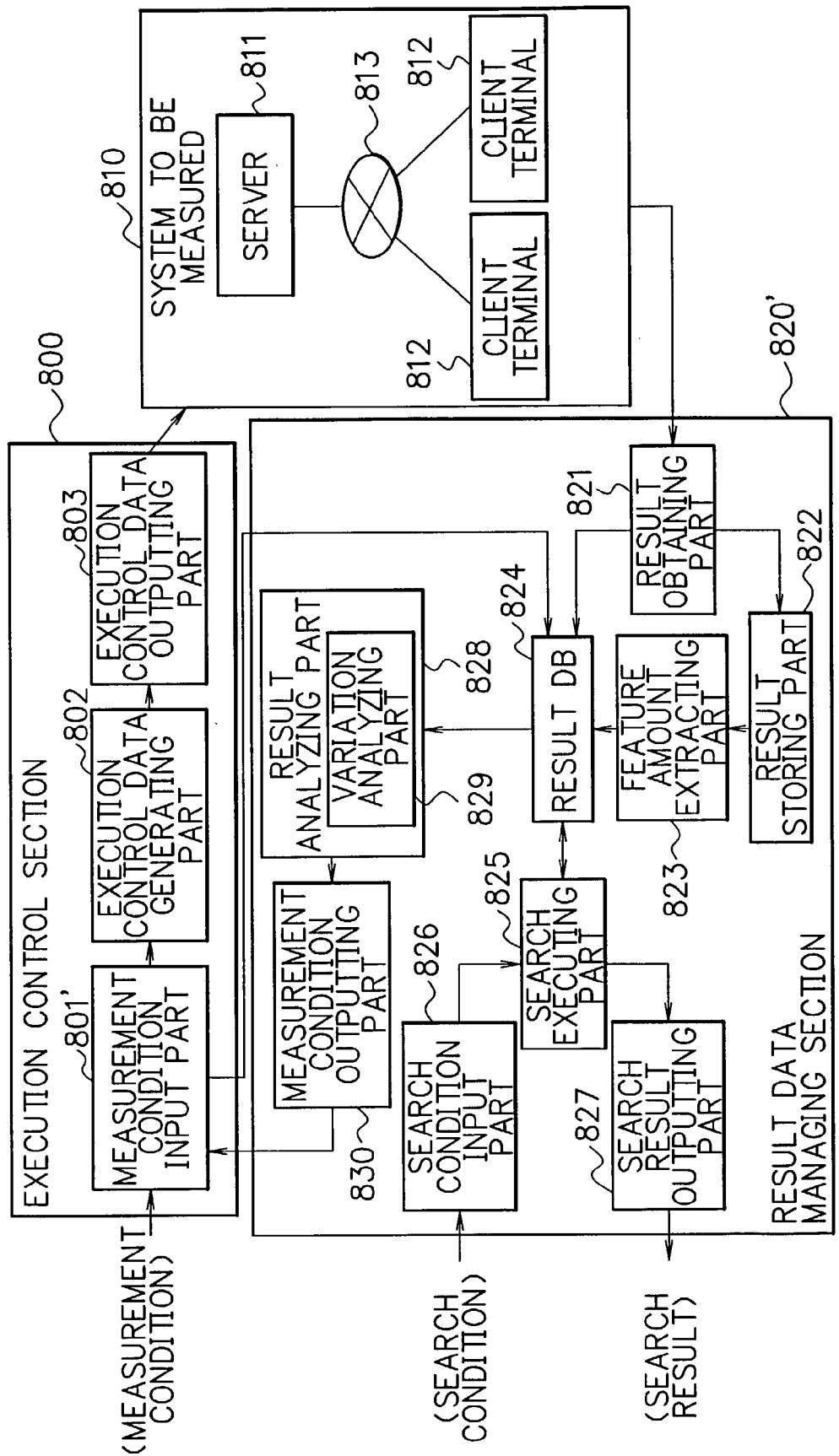
FIG. 14 is a block diagram showing a configuration example of a performance evaluation system according to a fourth embodiment of the present invention.

FIG. 14 is a block diagram showing a configuration example of a performance evaluation system to which a performance evaluation device according to the fourth embodiment of the present invention is applied. Note that, in FIG. 14, the same reference numerals are used to designate blocks having the same functions as those of the blocks shown in FIG. 8 and FIG. 12, and the explanation having the same contents will be omitted. The same reference numerals with an apostrophe (') added thereto are used to designate blocks having functions corresponding, though not identical, to those of the blocks shown in FIG. 8 and FIG. 12.

In the performance evaluation system in the third embodiment described above, the recommended measurement condition outputted by the result analyzing part 828 is outputted to the external part via the measurement condition outputting part 830. In the performance evaluation system in the fourth embodiment, however, the recommended measurement condition outputted from the result analyzing part 828 is supplied to a measurement condition input part 801' so as to have the benchmark executed automatically.

In FIG. 14, the measurement condition input part 801' is a part to which the externally supplied measurement condition for the benchmark and the recommended measurement condition for the benchmark supplied from the measurement condition outputting part 830 are to be inputted. Here, the execution control section 800 in this embodiment constitutes an execution control means of the present invention.

Next, the operation of the performance evaluation system shown in FIG. 14 mentioned above will be explained.

Figure 15:
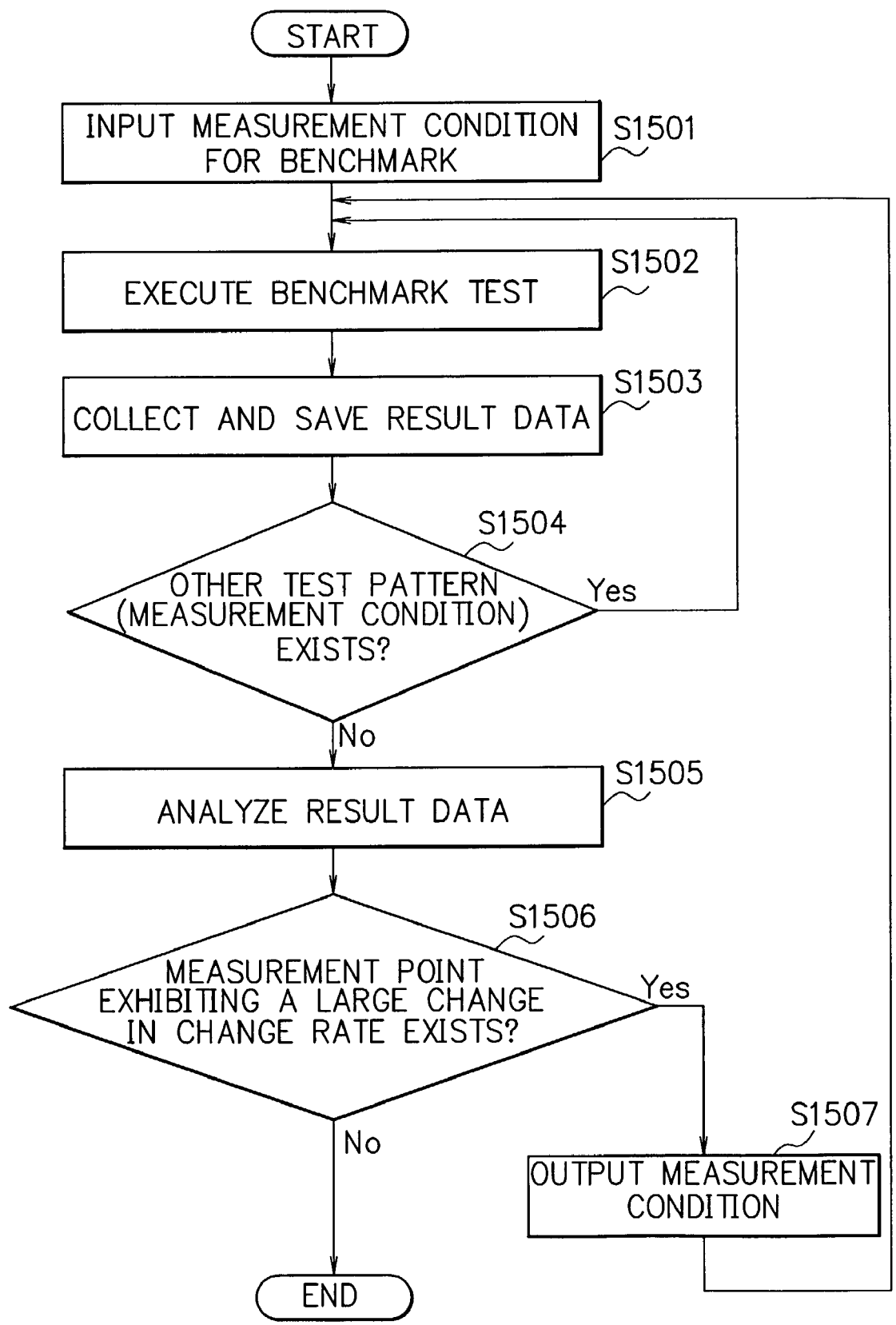
FIG. 15 is a flow chart showing the processing operation of the performance evaluation system according to the fourth embodiment.

FIG. 15 is a flow chart showing the processing operation of the performance evaluation system according to the fourth embodiment.

In FIG. 15, Step S1501 to Step S1506 correspond to Step S1301 to Step S1306 shown in FIG. 13 mentioned above respectively. The same operations as those of the performance evaluation system in the third embodiment are performed in these steps. In Step S1506, the result analyzing part 828 judges whether or not there exists a measurement point exhibiting a large change rate in the change rates of performance change calculated in the variation analyzing part 829.

When the result of the judgment leads to the judgment that there exists a measurement point exhibiting a large change rate of performance change, the result analyzing part 828 outputs the recommended measurement condition including a set value of a parameter at the measurement point exhibiting a large change rate of performance change to the measurement condition input part 801' via the measurement condition outputting part 830 in Step S1507. Then, Step S1502 to Step S1506 are processed again.

Then, the processing in Step S1502 to Step S1507 is repeated until the result analyzing part 828 judges as a result of the judgment in Step S1506 that there exists no measurement point exhibiting a large change rate of performance change. When the result of the judgment in Step S1506 leads to the judgment that there exists no measurement point exhibiting a large change rate of performance change, the processing is finished.

Figure 16:
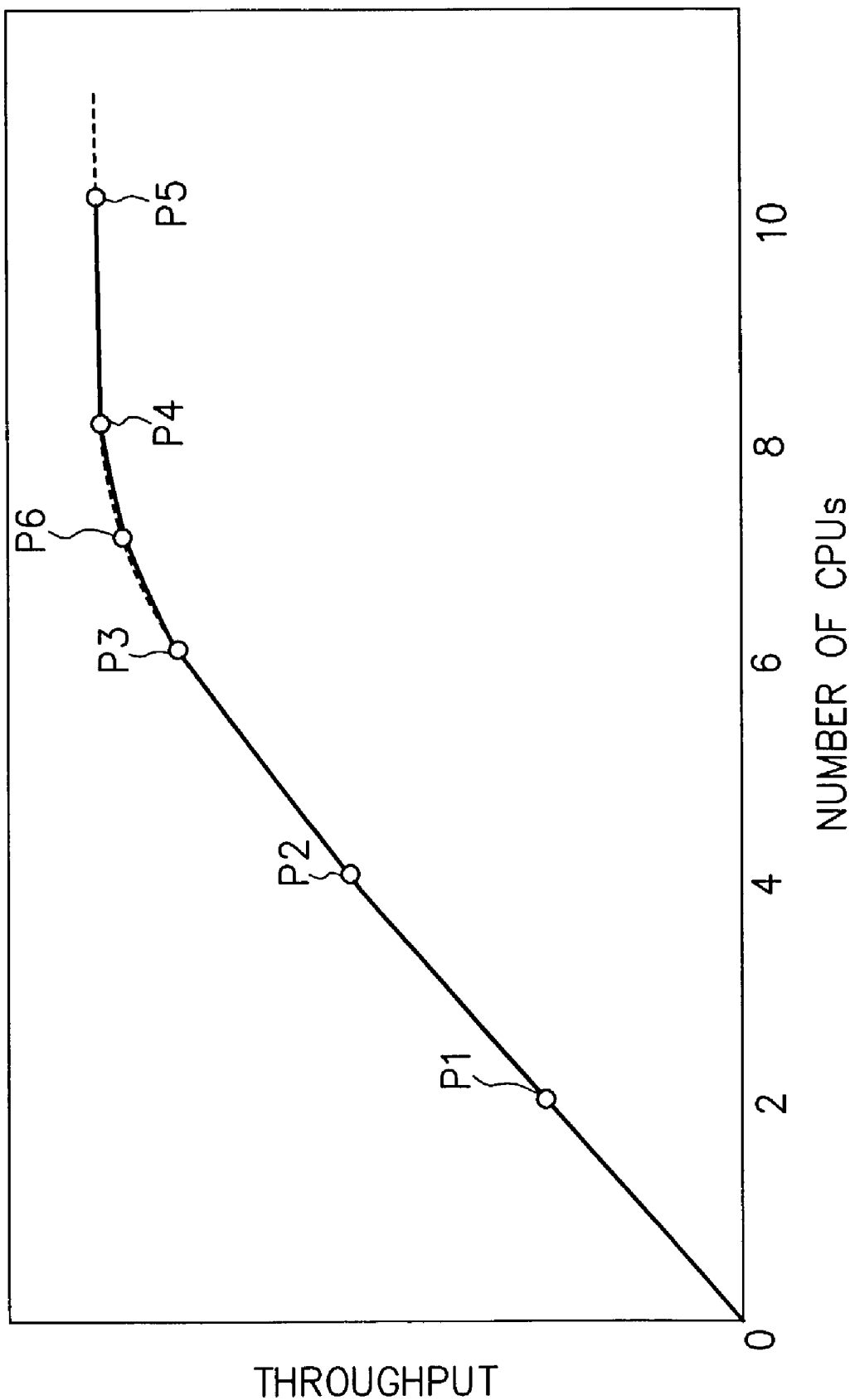
FIG. 16 is a chart showing an example of a performance curve obtained by the performance evaluation system according to the fourth embodiment.

As a result of processing performed in the performance evaluation system as in the above-described manner, a performance curve, for example, shown in FIG. 16 is obtainable.

FIG. 16 is a chart showing an example of a performance curve obtained in the performance evaluation system in the fourth embodiment. The performance curve shown in FIG. 16 is a performance curve showing a processing capacity per unit time (throughput) in the information processing system 810 under the measurement conditions in which only the set value of the parameter 'the number of CPUs' is varied and the set values of other parameters are fixed.

In FIG. 16, points P1, P2, P3, P4, P5 are points indicating the throughput in the information processing system 810 when the set values of the parameter, 'the number of CPUs', are set to "2", "4", "6", "8", "10" respectively at initial setting (Step S1501 in FIG. 15). As shown in FIG. 16, between the points P1 and P3, the throughput exhibits a substantially proportional increase to the increase in the number of CPUs. Between the points P3 and P4, the throughput exhibits a slight increase in response to the increase in the number of CPUs. Between the points P4 and P5, the throughput exhibits substantially no increase in response to the increase in the number of CPUs, substantially the same value being maintained.

When the performance evaluation data shown at the points P1, P2, P3, P4, P5 are obtained, the result analyzing part 828 shown in FIG. 14 judges that the change rate of performance change is large between the points P3 and P4. Then, the result analyzing part 828 outputs the measurement condition in which the set value of the parameter, 'the number of CPUs', corresponding to a point between the points P3 and P4 is set to 7 and the benchmark is accordingly executed. Hence, the performance evaluation data shown at the point P6 compensating for the range between the points P3 and P4 is obtained. As a result, the performance curve of the information processing system 810 as shown in FIG. 16 is obtainable.

A detailed performance curve in the information processing system 810 is thus obtained. This makes it possible to estimate the performance evaluation data under a desired measurement condition and in a reverse way, to estimate the configuration (hardware and software) of the information processing system satisfying performance requirements.

As explained hitherto, according to the fourth embodiment, not only the effect obtained in the second and third embodiments described above is obtained but also the performance evaluation data is obtained by automatically executing the benchmark under the recommended measurement condition outputted from the result analyzing part 828. Thus, it is made possible to generate a necessary and appropriate measurement condition automatically to execute the benchmark and to obtain detailed performance evaluation data in the information processing system 810 only by the operator's initial input of the minimum measurement conditions. Consequently, automatic measurement of the performance in the information processing system 810 can be made with high efficiency to obtain the performance evaluation data without any operation by the operator or the like during the measurement.

-Other Embodiments-

It should be noted that the performance evaluation device and the performance evaluation information managing device described above can be constituted by a CPU of a computer, an MPU, a RAM, a ROM, or the like, and are realizable by the operation of a program stored in the RAM or the ROM. The above-mentioned program is embraced in the embodiments of the present invention. Further, they are realizable in such a manner that the program to cause a computer to achieve the above-described functions is recorded on a recording medium such as, for example, a CD-ROM so as to have the computer read the program. The above-mentioned recording medium recording the above-mentioned program thereon is embraced in the embodiments of the present invention. As the recording medium recording the above-mentioned program thereon, a flexible disk, a hard disk, a magnetic tape, a magneto-optical disk, a nonvolatile memory card, and so on can be used besides the CD-ROM.

Further, a program product realizing the functions in the above-described embodiments by the computer's execution and processing of the program is embraced in the embodiments of the present invention. The above-mentioned program product includes the program itself realizing the functions of the above-described embodiments, a computer into which the above-mentioned program is read, a transmitting device which can provide the above-mentioned program to a computer communicatably connected thereto via a network, a network system provided with this transmitting device, and the like.

Moreover, not only in the case where a computer executes a supplied program to realize the functions of the above-described embodiments, but also in the case where the program cooperates with an OS (operating system), other application, or the like operating in the computer to realize the functions of the above-described embodiments, and in the case where all or a part of the processing of the supplied program is performed by a function expansion board or a function expansion unit of the computer to realize the functions of the above-described embodiments, such a program is embraced in the embodiments of the present invention.

Moreover, all or a part of the program may be executed by a different computer in order to utilize the present invention in a network environment.

Figure 17:
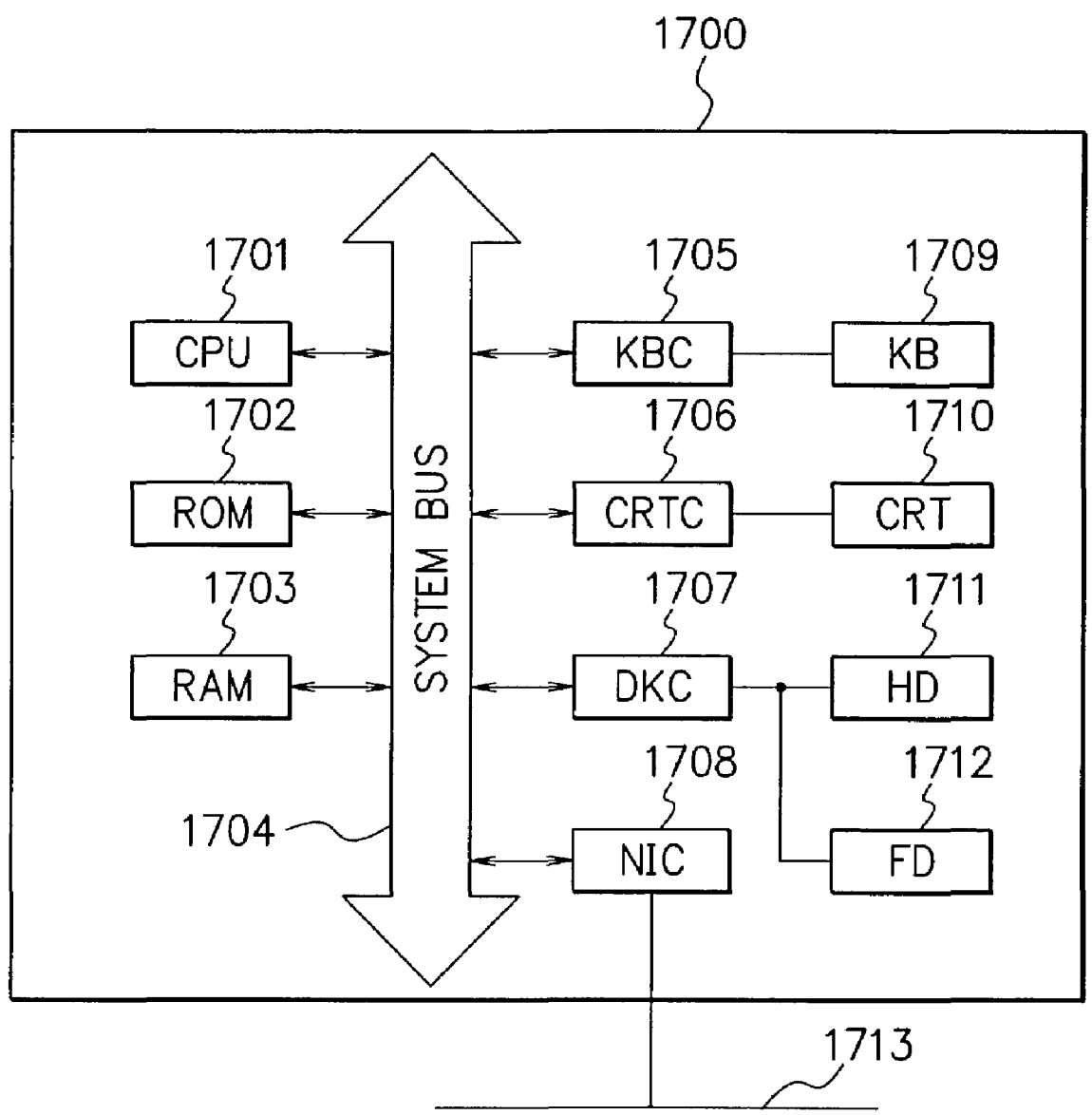
FIG. 17 is a block diagram showing a configuration example of a computer capable of realizing a performance evaluation information managing device and a performance evaluation device.

For example, the performance evaluation device and the performance evaluation information managing device shown in the above-described embodiments have a computer function 1700 as shown in FIG. 17, and a CPU 1701 thereof performs the operations in the first to fourth embodiments described above.

The computer function 1700, as shown in FIG. 17 mentioned above, is so configured that the CPU 1701, a ROM 1702, a RAM 1703, a keyboard controller (KBC) 1705 of a keyboard (KB) 1709, a CRT controller (CRTC) 1706 of a CRT display (CRT) 1710 as a display part, a disk controller (DKC) 1707 of a hard disk (HD) 1711 and a flexible disc (FD) 1712, and a network interface card (NIC) 1708 are communicatably connected to one another via a system bus 1704.

The CPU 1701 executes software (program) stored in the ROM 1702 or the HD 1711, or executes software (program) supplied from the FD 1712 to totally control each of the constituent parts connected to the system bus 1704.

Specifically, the CPU 1701 reads a processing program for performing the above-described operations from the ROM 1702, the HD 1711, or the FD 1712 to execute the read processing program, thereby performing the control for realizing the operations in the first to fourth embodiments described above.

The RAM 1703 functions as a main memory, a work area, or the like of the CPU 1701.

The KBC 1705 controls instruction input from the KB 1709, a not-shown pointing device, or the like. The CRTC 1706 controls the display of the CRT 1710. The DKC 1707 controls access to the HD 1711 and the FD 1712 storing a boot program, various applications, user files, a network managing program, the above-mentioned processing program in this embodiment, and the like. The NIC 1708 exchanges data bi-directionally with other devices in the network 1713.

It should be noted that the above-described embodiments are to be considered in all respects as illustrative and no restrictive, and all changes which come within the meaning and range of equivalency of the claims are therefore intended to be embraced therein. The invention may be embodied in other specific forms without departing from the sprit or essential characteristics thereof.

As explained hitherto, according to the present invention, the condition input screen is divided into the portion relevant to the first information processing apparatus group, the portion relevant to the second information processing apparatus group, and the portion relevant to a predetermined service, thereby enabling a common form to be used for the condition input screen and allowing a plurality of set values to be inputted for a measurement condition, and the information processing system is controlled to execute the performance test based on the performance test data which is automatically generated by arbitrarily combining the set values of different items in the measurement conditions. This makes it possible to simultaneously input a plurality of different measurement conditions, combine these measurement conditions arbitrarily to generate a plurality of performance test data automatically, and control the information processing system to execute the performance test based on the plural generated performance test data. Therefore, by inputting the plural set values simultaneously on the condition input screen, the plural generated performance test data are supplied to the information processing system. This enables automatic and successive execution of the benchmark tests under the plural different measurement conditions.

Further, the execution results of the performance measurement tests executed in the information processing system to be evaluated under various measurement conditions are obtained respectively, and the performance evaluation information respectively obtained from the execution results and the measurement conditions corresponding thereto are stored on the storage medium in such a manner that they are related to each other. Hence, sets of the plural measurement conditions and performance evaluation information can be stored on the storage medium, being classified by each measurement condition, each set consisting of each of the measurement conditions and performance evaluation information related to each other. Accordingly, the performance evaluation information obtained from the performance measurement tests under various measurement conditions can be concentratedly managed. This can facilitate the search and comparison of the performance evaluation information obtained from the performance measurement tests under various measurement conditions.

Moreover, when the performance evaluation information and the measurement condition stored on the storage medium can be searched for according to the externally inputted search condition, the search and the comparison of the performance evaluation information obtained from the performance measurement tests executed in the past can be facilitated.

Further, when the recommended measurement condition is determined and provided based on the performance evaluation information and the measurement condition stored on the storage medium, a measurement condition appropriate for the performance measurement of the information processing system can be easily obtained without any calculation being made by a measurer or the like based on the performance evaluation information and so on. Therefore, the performance of the information processing system can be measured with high efficiency and, in addition, with a small number of measurement conditions.

Moreover, when the performance measurement test according to the provided recommended measurement condition is automatically executed in the information processing system, the detailed measurement of the performance of the information processing system can be automatically made only with the measurer's initial input of the minimum measurement condition. Therefore, the performance of the information processing system can be measured with very high efficiency to obtain the performance evaluation information without any work by the measurer or the like during the measurement.

What is claimed is:

1. A performance evaluation device, comprising:
    a result obtaining means for obtaining execution results of performance measurement tests executed under a plurality of measurement conditions in an information processing system to be evaluated, respectively;
    an information storing means for storing on a storage medium performance evaluation information obtained from the execution results obtained by said result obtaining means respectively and said measurement conditions corresponding to said performance evaluation information in such a manner that they are related to each other;
    a measurement condition providing means for determining and providing a recommended measurement condition based on said performance evaluation information and the measurement conditions stored on said storage medium; and
    a variation analyzing means for analyzing, based on said performance evaluation information and the measurement conditions, performance change in response to change in said measurement condition, the performance change being indicated by said performance evaluation information,
    wherein said measurement condition providing means determines said recommended measurement condition based on a result of the analysis by said variation analyzing means.

2. The performance evaluation device according to claim 1, further comprising:
    an execution control means for controlling execution of the performance measurement test in said information processing system according to the recommended measurement condition provided by said measurement condition providing means.

3. The performance evaluation device according to claim 1,
wherein said variation analyzing means calculates a ratio of the performance change in response to the change in said measurement condition, the performance change being indicated by said performance evaluation information, and
wherein said measurement condition providing means determines said recommended measurement condition based on the ratio of the performance change calculated by said variation analyzing means.

4. The performance evaluation device according to claim 1, further comprising:
an information search means for searching said performance evaluation information and said measurement conditions stored on said storage medium according to a search condition externally inputted.

* * * * *